(12) United States Patent
Arov et al.

(10) Patent No.: US 7,913,714 B2
(45) Date of Patent: Mar. 29, 2011

(54) CHECK VALVE AND SHUT-OFF RESET DEVICE FOR LIQUID DELIVERY SYSTEMS

(75) Inventors: Gennady Arov, Bayside, WI (US); Larry M. Molinari, Mequon, WI (US)

(73) Assignee: Perlick Corporation, Milwaukee, WI (US)

( * ) Notice: Subject to any disclaimer, the term of this patent is extended or adjusted under 35 U.S.C. 154(b) by 789 days.

(21) Appl. No.: 11/847,826

(22) Filed: Aug. 30, 2007

(65) Prior Publication Data

US 2009/0056816 A1 Mar. 5, 2009

(51) Int. Cl.
*F16K 17/00* (2006.01)
*B67D 5/54* (2006.01)

(52) U.S. Cl. ............ 137/456; 137/212; 137/467.5; 137/523; 222/400.7; 222/400.8; 222/401; 251/89; 251/101

(58) Field of Classification Search ............ 137/456, 137/467.5, 212, 523; 251/89, 101; 222/400.7, 222/400.8, 401
See application file for complete search history.

(56) References Cited

U.S. PATENT DOCUMENTS

| | | | | |
|---|---|---|---|---|
| 1,684,603 A * | 9/1928 | Stephenson | ........ | 251/89 |
| 2,898,080 A * | 8/1959 | Smith | ........ | 251/82 |
| 3,408,040 A * | 10/1968 | Kraft | ........ | 251/257 |
| 3,408,041 A * | 10/1968 | Kraft | ........ | 251/260 |
| 3,561,466 A * | 2/1971 | Carden | ........ | 137/102 |
| 4,159,102 A * | 6/1979 | Fallon et al. | ........ | 251/149.6 |
| 4,249,572 A * | 2/1981 | Shindelar et al. | | |
| 4,291,821 A * | 9/1981 | Nezworski | ........ | 222/153.04 |
| 4,305,421 A * | 12/1981 | Fallon | ........ | 137/322 |
| 4,461,314 A * | 7/1984 | Kramer | | |
| 4,546,791 A * | 10/1985 | Huang | | |
| 4,612,952 A * | 9/1986 | Fallon | ........ | 137/212 |
| 4,728,010 A * | 3/1988 | Johnston | ........ | 222/397 |
| 4,736,926 A * | 4/1988 | Fallon et al. | ........ | 251/149.9 |
| 4,825,903 A * | 5/1989 | Ochs et al. | | |
| 5,113,899 A * | 5/1992 | Yonezawa | ........ | 137/461 |
| 5,145,096 A * | 9/1992 | Stenger | ........ | 222/400.8 |
| 5,190,362 A | 3/1993 | Schaefer et al. | | |
| 5,630,441 A | 5/1997 | Feldman | | |
| 5,725,014 A | 3/1998 | Liu | | |

(Continued)

FOREIGN PATENT DOCUMENTS

| | | |
|---|---|---|
| DE | 1004003893 | 8/2004 |
| EP | 110289 | 5/1986 |
| EP | 103250 | 7/1986 |
| EP | 1382893 | 1/2004 |

(Continued)

*Primary Examiner* — Stephen M Hepperle
*Assistant Examiner* — William McCalister
(74) *Attorney, Agent, or Firm* — Nicholas A. Kees; Godfrey & Kahn, S.C.

(57) ABSTRACT

A check valve assembly which in an open position allows liquid to flow in one direction through the assembly including a moving sealing member which engages a seal to prevent liquid flow in a second opposite direction. The sealing member may be moved into engagement with the seal by rotation of a stem with an eccentric to block flow in both directions. A check valve and shut-off device assembly which in an open position allows liquid to flow in one direction through the assembly until gas or foam is mixed with the liquid. The shut-off device includes a sealing member which engages a seal to block flow through the assembly when foam or gas is present in the liquid. The check valve includes a sealing member which can reset the shut-off device. The check valve sealing member also engages the same sealing member to prevent any flow through the assembly in a closed position. In an open position, the check valve sealing member may engage the seal to prevent reverse flow of liquid through the assembly.

7 Claims, 20 Drawing Sheets

U.S. PATENT DOCUMENTS

| | | | |
|---|---|---|---|
| 5,850,844 A | 12/1998 | Iversen | |
| 6,513,556 B1 * | 2/2003 | Nimberger et al. | ........... 141/387 |
| 6,719,000 B1 | 4/2004 | Forsythe | |
| 6,796,323 B1 | 9/2004 | Taylor | |
| 6,811,060 B2 | 11/2004 | Petit | |
| 6,953,054 B2 | 10/2005 | Oba et al. | |
| 2004/0011823 A1 * | 1/2004 | Petit | |
| 2005/0029308 A1 * | 2/2005 | Benett | |

FOREIGN PATENT DOCUMENTS

| | | | |
|---|---|---|---|
| EP | 1681500 | * | 7/2006 |
| FR | 2869382 | | 4/2004 |
| JP | 11107884 | | 4/1999 |
| JP | 11132394 | | 5/1999 |
| JP | 2004225717 | | 8/2004 |
| SU | 1460511 | | 8/1986 |
| WO | 2005106301 | | 11/2005 |

\* cited by examiner

US 7,913,714 B2

CHECK VALVE AND SHUT-OFF RESET DEVICE FOR LIQUID DELIVERY SYSTEMS

TECHNICAL FIELD

The present disclosure relates generally to check valves for use with liquid delivery systems.

BACKGROUND

Conventional ball valves may include a spherical or semi-spherical shaped sealing member within a liquid flow passage. The sealing member may include a central opening through which liquid may flow depending on the orientation of the sealing member within the flow passage. To prevent liquid flow about the sealing member, seals may be providing along inner walls of the flow passage which engage an outer portion of the sealing member. Typically, a seal is provided on each of the upstream and downstream sides of the valve and the seals are spaced apart wider than the width of the central opening through the sealing member.

When open, the central passage of the sealing member of a conventional ball valve is generally oriented parallel to an axis of flow through the flow passage. As a conventional ball valve is closed, the central opening of the sealing member is rotated away from alignment with the axis of the flow passage. When fully closed, the central opening of the sealing member will typically still contain a certain amount of the liquid. This liquid is held within the central opening by the same seals that prevent flow of liquid about the sealing member.

The fluid held within the central passage of a closed ball valve may be begin to deteriorate or to stagnate. When the valve is reopened, the degraded fluid with the central passage may enter the fluid delivery system downstream of the valve and may contaminate the liquid being delivered.

Other conventional valve types may also include pockets or recesses where liquid being transported through the valve may become trapped.

It is desirable to improve on valves used in liquid delivery systems.

In stadiums and other large facilities that may have a number of concession stands spread out over a large area, it is common to centralize the liquid supply for beer, soda and other drinks that may be dispensed at the concession stands or other points of purchase. Liquid delivery networks are provided to transport liquid from the central supplies to each concession stand. It is not uncommon for delivery lines to extend for four hundred to eight hundred or more feet. In such installations, it is desirable to have a sensor at the supply end of the line to shut off flow into the line when a soda container or beer keg has been depleted and gas starts to enter the line. If the gas is permitted to run the length of the supply line to the tap, it can take an undesirable amount of time to refill the lines after the soda or beer has been replaced.

Self-closing control valves for use with such installations are known. An example of such a liquid/gas shut-off valve is described in U.S. Pat. No. 5,630,441, the disclosure of which is incorporated herein by reference. However, these self-closing valves require a reset mechanism once the source of beer or soda has been replaced. Different versions of resets have been developed but none is completely satisfactory.

Problems with conventional approaches to resetting these self-closing valves include a lack of robustness and requiring a high degree of precision or care in operation.

Another issue with conventional self-closing valves and reset options is that often these valves and resets also act as check valves. When it is necessary to clean the delivery lines between the source and the tap, bi-directional flow of cleaning solution through the lines may be desired. The check valves used in the self-closing valves and the valve resets may either prevent or hinder the flow of cleaning solution through the delivery lines.

Improvements to resets for self-closing valves and for check valves used in liquid delivery systems are desirable.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
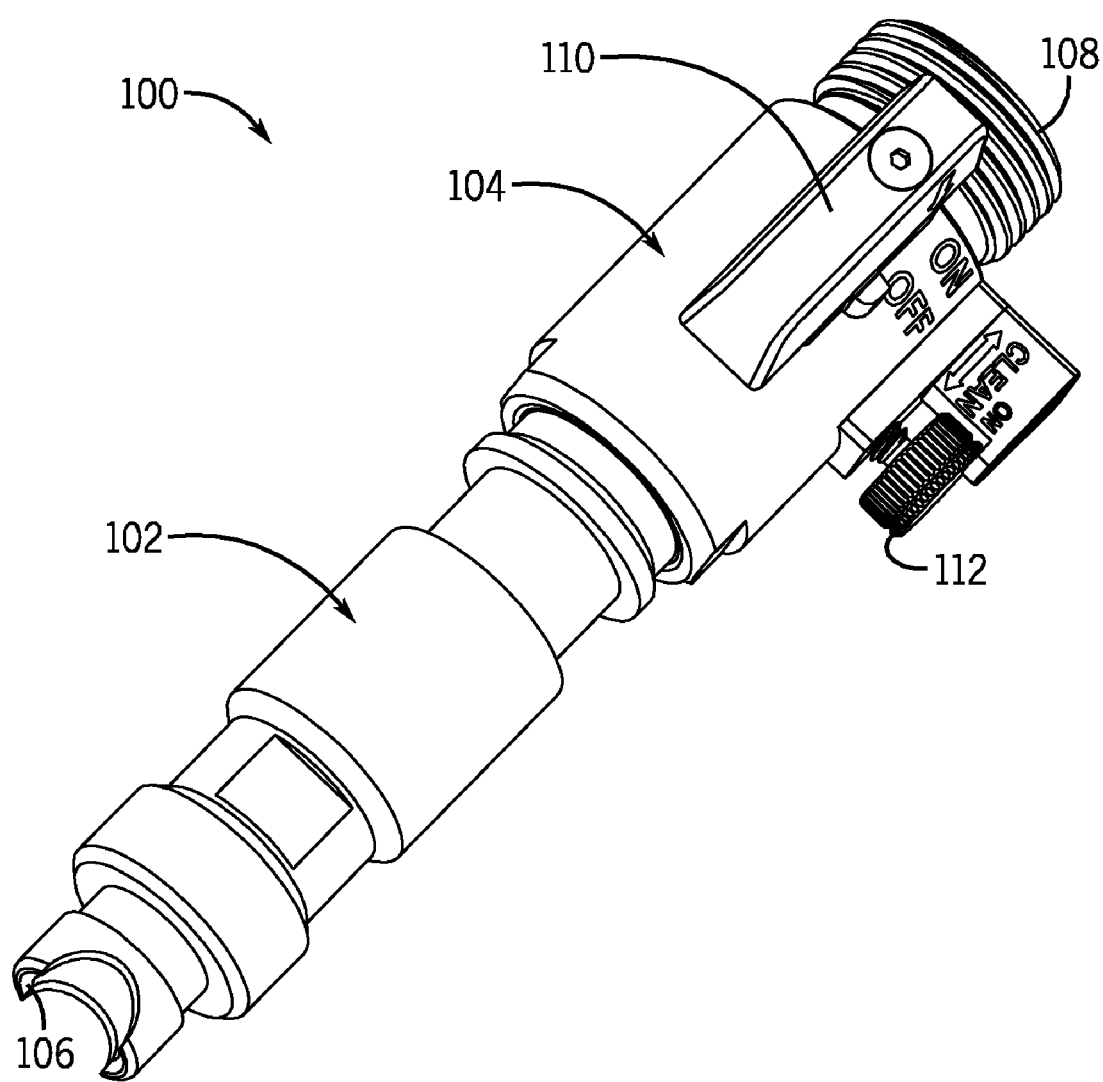
FIG. 1 is a perspective view of a check valve and shut-off valve reset assembly according to the present disclosure with a shut-off valve attached.

Referring now to FIG. 1, a check valve and valve reset assembly 100 may include a shut-off valve assembly 102 and an antiback-flow/valve reset assembly 104. Assembly 100 is configured to allow a flow of liquid as part of a liquid distribution system. Under normal operating conditions, liquid flow through assembly 100 is into a first end 106 of valve assembly 102 and out of a second end 108 of reset assembly 104. Reset assembly 104 includes a handle 110 that may be used to configure reset assembly 104 for normal uni-directional liquid flow, resetting valve assembly 102 (as will be described below), or permitting bi-directional liquid flow. Note that handle 110 may include indicia such as an arrow or other marking which cooperates with markings on a valve reset body to indicate whether the condition or positions of internal components within assembly 100, as will be discussed further below. A thumbscrew or similar lock-out device 112 may be included to aid in the configuration of reset assembly 104 for bi-directional flow, such as might be used for flushing or cleaning a liquid delivery system to which assembly 100 may be connected. Thumbscrew 112 may also include indicia cooperating with markings on an exterior of the reset valve body to indicate the condition or positions of internal components, as will be discussed further below.

Figure 2:
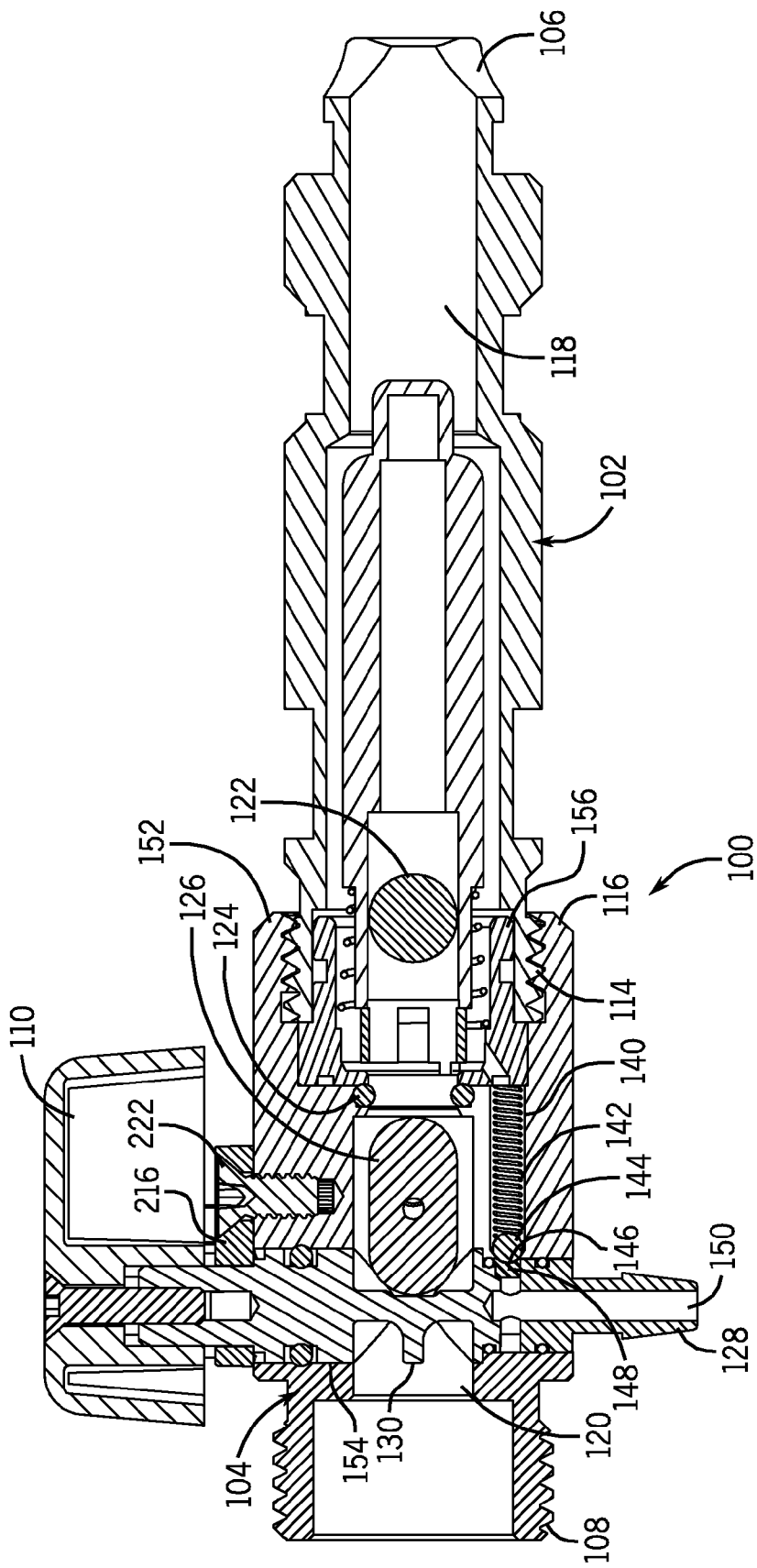
FIG. 2 is a first side cross-section view of the assembly of FIG. 1.
Figure 3:
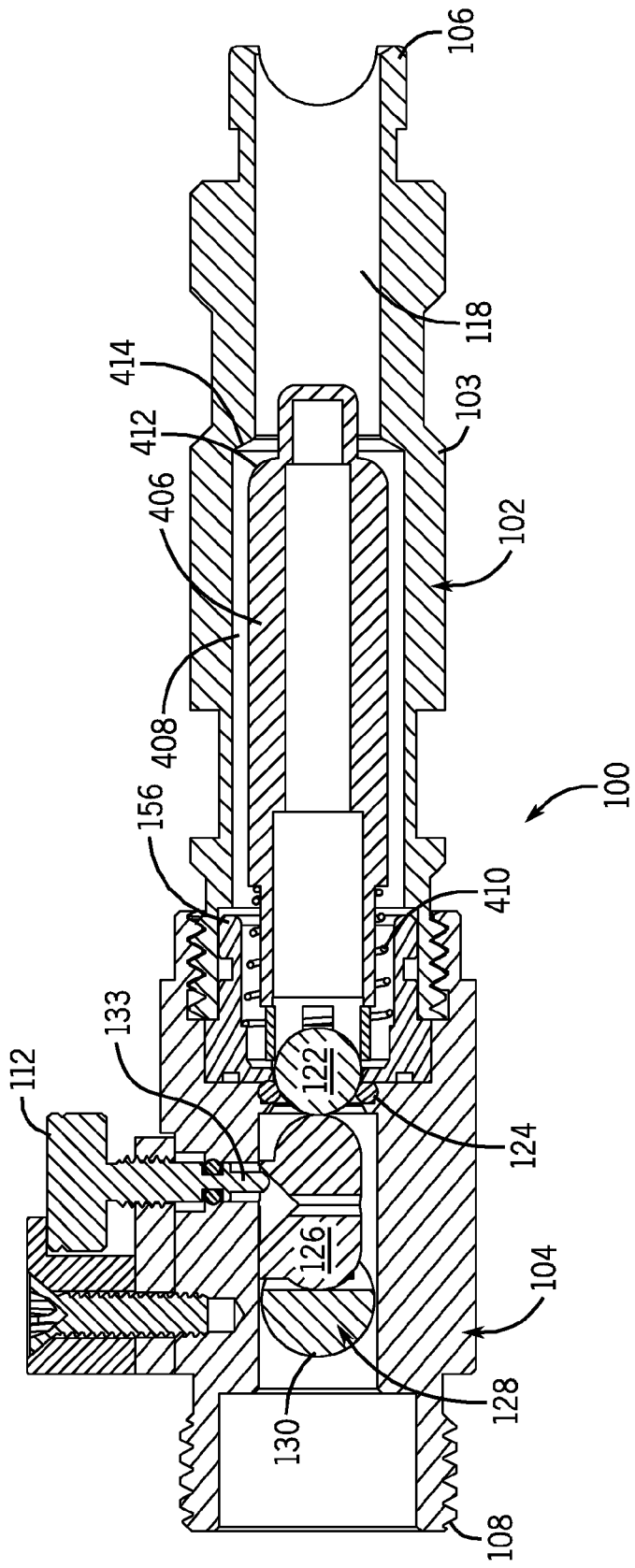
FIG. 3 is a second side cross-sectional view of the assembly of FIG. 1, rotated about ninety degrees about a longitudinal axis of the assembly from FIG. 2, with the check valve is a closed position.

As shown in FIGS. 2 and 3, valve assembly 102 includes a second end 114 which mates with a first end 116 of reset assembly 104, providing a sealed connection between a central axial passage 118 of valve assembly 102 and a central axial chamber 120 of reset assembly 104. Liquid is permitted to flow through assembly 100 from first end 106 to second end 108 through the axial chambers 118 and 120. In some installations, such as systems for delivering or distributing carbonated beverages, it may be desirable to ensure that only liquid is allowed to pass through assembly. Shut-off valve assembly 102 is configured similar to the devices disclosed in U.S. Pat. No. 5,630,441, the disclosure of which is incorporated herein by reference, and may operate to shut a fluid connection between axial chamber 118 and 120 if gas enters valve assembly 102 through first end 106. A sealing member, such as a ball 122 is provided within valve assembly 102, is urged against a sealing member, such as O-ring 124, when gas enters axial chamber 118, and prevents the flow of gas and liquid through second end 114 of valve assembly 102. This sealed or shut-off position is shown in FIG. 3.

Reset assembly 104 includes a rotating stem 128 to which may be mounted handle 110. A reset member 126 is positioned within chamber 120 between stem 128 and seal 124. Thumbscrew 112 includes a stem 133 which extends to, and selectively engages reset member 126. As shown in an open flow position in FIG. 2, liquid is permitted to flow through first end 106 into axial chamber 118 past ball 122, through second end 114 and past reset member 126 to second end 108. In FIG. 3, ball 122 has moved to engage seal 124 and prevent flow between assemblies 102 and 104, due to gas within the liquid entering through first end 106. When a proper liquid flow has been restored through first end 106, a manner of moving ball 122 from seal 124 is required to reestablish liquid flow through assembly 100.

Figure 4:
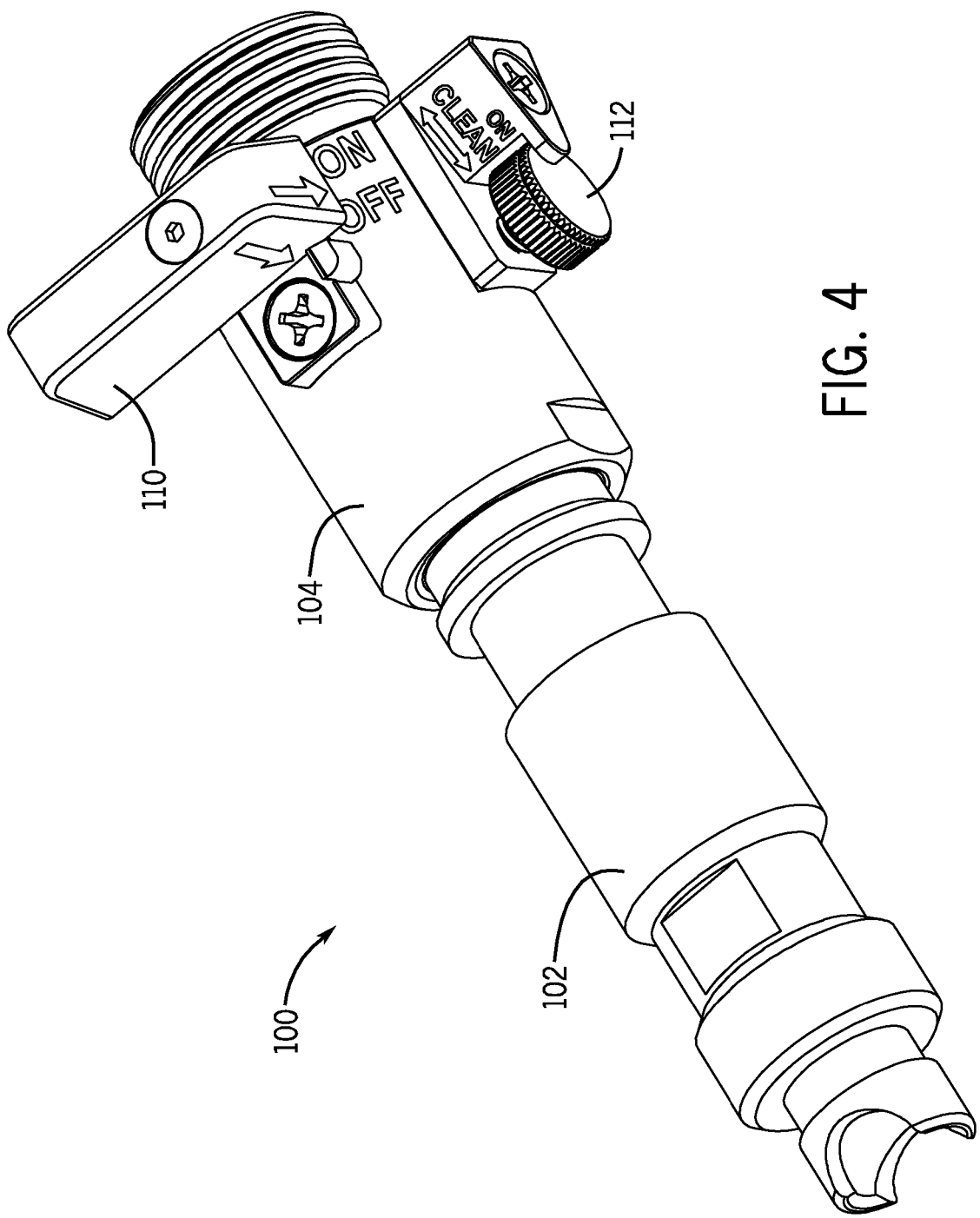
FIG. 4 is a perspective view of the assembly of FIG. 1, with the shut-off valve in a closed position.
Figure 5:
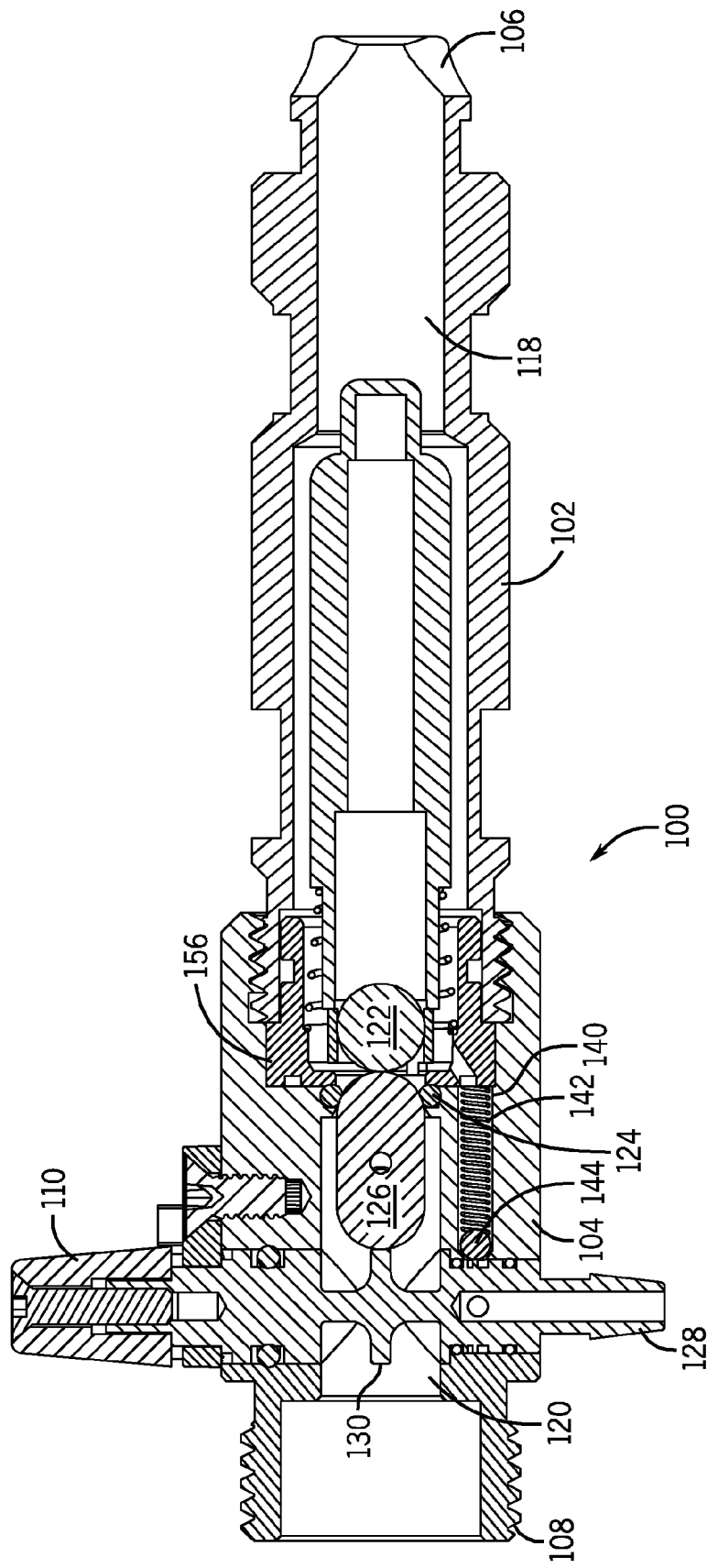
FIG. 5 is a first side cross-section view of the assembly of FIG. 4.
Figure 6:
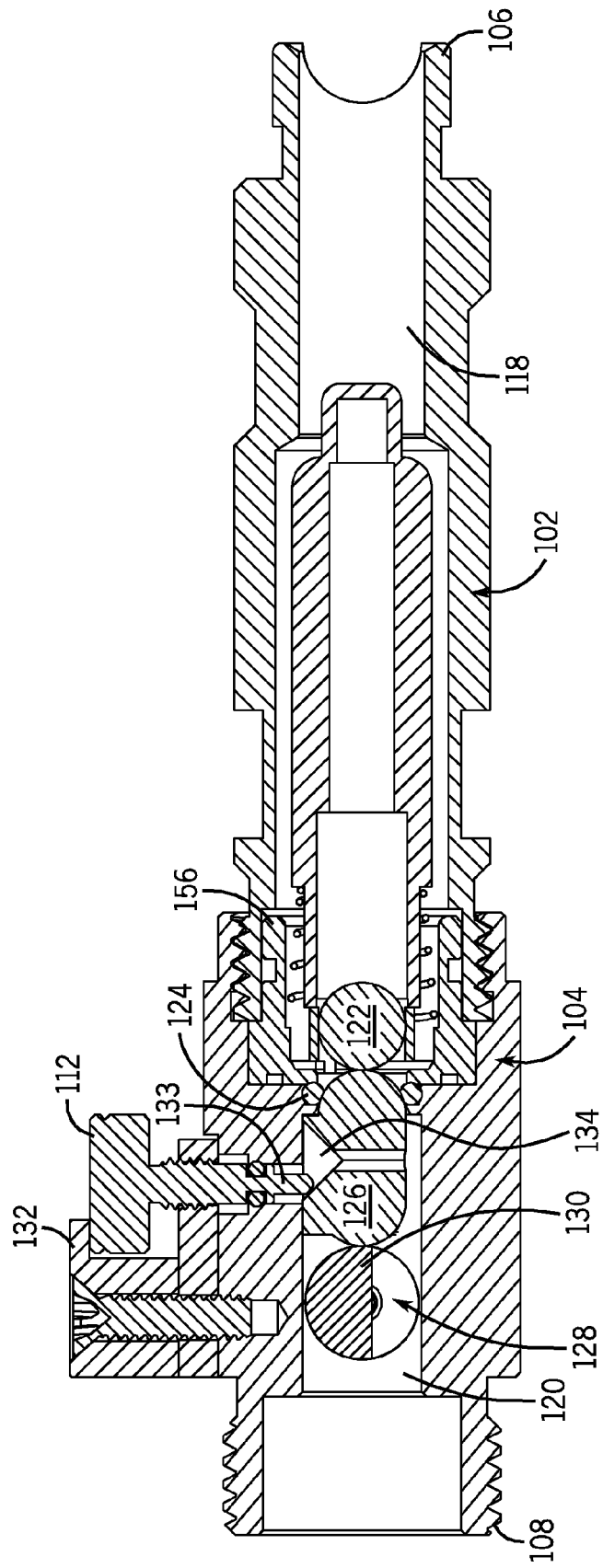
FIG. 6 is a second side cross-sectional view of the assembly of FIG. 4, rotated about ninety degrees about a longitudinal axis of the assembly from FIG. 5.

Referring now to FIGS. 4 to 6, handle 110 and connected stem 128 have been rotated approximately ninety degrees to place reset assembly 104 into a closed/reset position. As shown in FIGS. 5 and 6, stem 128 includes a portion 130 which engages sealing member 126 and urges the member into engagement with seal 124. In engaging seal 124, member 126 also engages ball 122 and displaces ball 122 from engagement with seal 124. Note that flow is still blocked between chamber 118 and 120 but that liquid within chamber 118 is now permitted past ball 122 and seal 124. Member 126 now cooperates with seal 124 to prevent movement of liquid into chamber 120. If desired, first end 106 of assembly 102 may be connected to a new source of liquid, such as a fresh keg of beer or another new source of carbonated liquid. As shown, sealing member 126 is generally sized similarly to ball 122 so that the same seal 124 can engage both and form an acceptable seal to prevent unwanted movement between chambers 118 and 120. It is desirable that member 126 as it engages ball 122 define a semi-spherical shape to engage seal 124 and that this shape be of a similar radius to ball 122. The remainder of member 126 as it engages stem 133 and is engaged by portion 130 of stem 128, may be sized and shaped as desired for manufacturing or assembly efficiency, maximum flow, or even aesthetic desires.

Once a proper liquid flow has been established to valve assembly 102, handle 110 and stem 128 may be returned to the open position shown in FIG. 2. This permits member 126 to move away from seal 124 due to pressure from the liquid within chamber 118. Assuming that liquid pressure within chamber 118 is higher than liquid pressure within chamber 120, member 126 is displaced from seal 124 and flow between first end 106 and second end 108 is reestablished. Note that with stem 128 in the open position, member 126 is free to move between seal 124 and stem 128. However, if liquid flow begins to reverse, meaning that liquid begins to flow through second end 108 toward first end 106, this liquid flow would urge member 126 into engagement with seal 124 and prevent backflow into chamber 118. Thus, assembly 104 may operate as both a valve reset device and a backflow prevention device.

Note that in FIG. 6, stem 133 of thumbscrew 112 is retracted away from member 126 as much as possible (complete removal of stem 133 and thumbscrew 112 is prevented by retainer 132). In this position, stem 133 may extend into a cavity 134 in member 126 to prevent rotation about a longitudinal axis of chamber 120 of member 126, while still permitting member 126 to move freely between stem 128 and seal 124. In this position, stem 133 does not impede the anti-backflow operation of member 126 within chamber 120.

Figure 7:
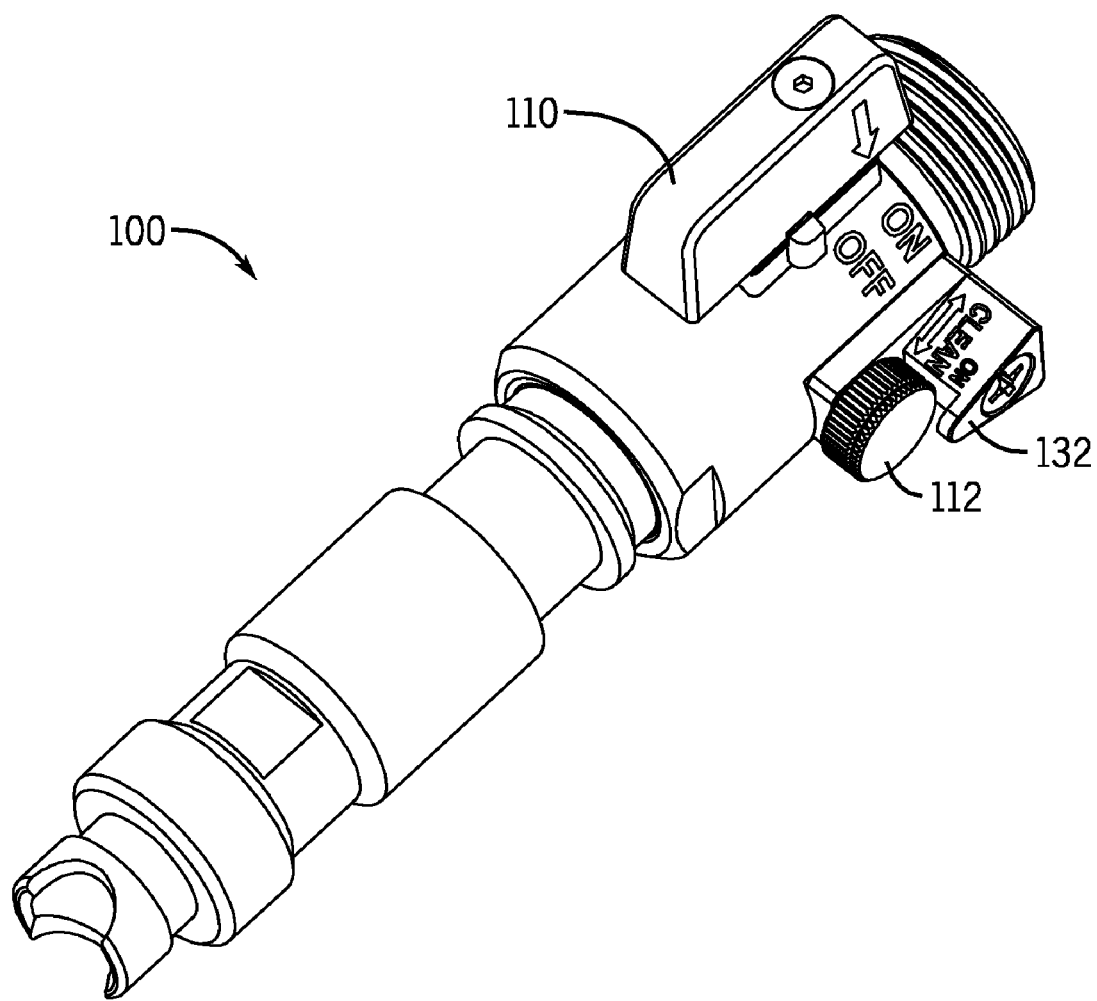
FIG. 7 is a perspective view of the assembly of FIG. 1, configured to permit bidirectional flow through the assembly.
Figure 8:
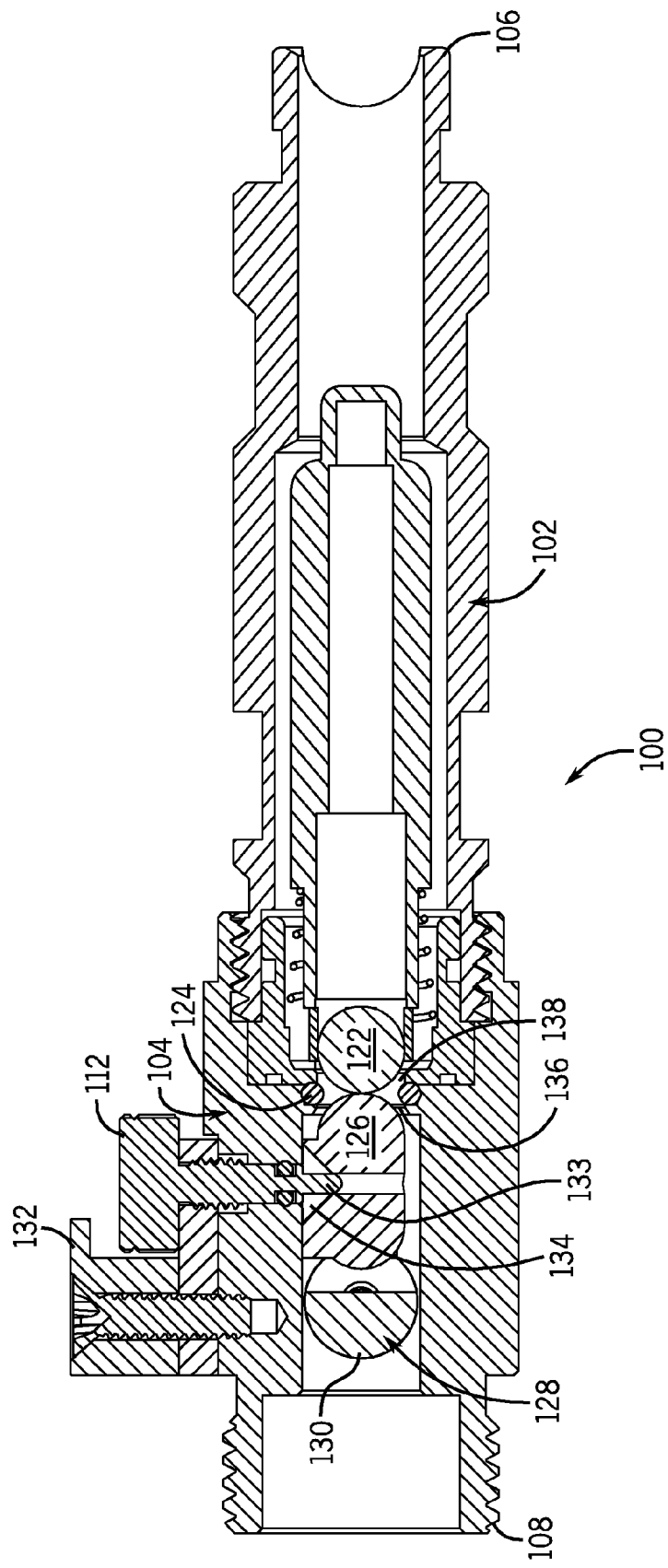
FIG. 8 is a side cross-section view of the assembly of FIG. 7.

Referring now to FIGS. 7 and 8, thumbscrew 112 is shown in a lowered or cleaning position. Stem 133 is engaged by recess 134 of member 126 and prevents longitudinal movement of member 126 between stem 128 and seal 124. A passage 136 is formed between member 126 and seal 124 and movement of member 126 to operate as an anti-backflow device is prevented. In this position, member 126 also prevents ball 122 from engaging seal 124 and blocking flow going from first end 106 to second end 108. While ball 122 may move further away from seal 124, the position of member 126 ensures that at least a passage 138 is defined between ball 122 and seal 124. These two passages ensure that a cleaning solution may be flushed through assembly 100 in both directions.

Figure 23:
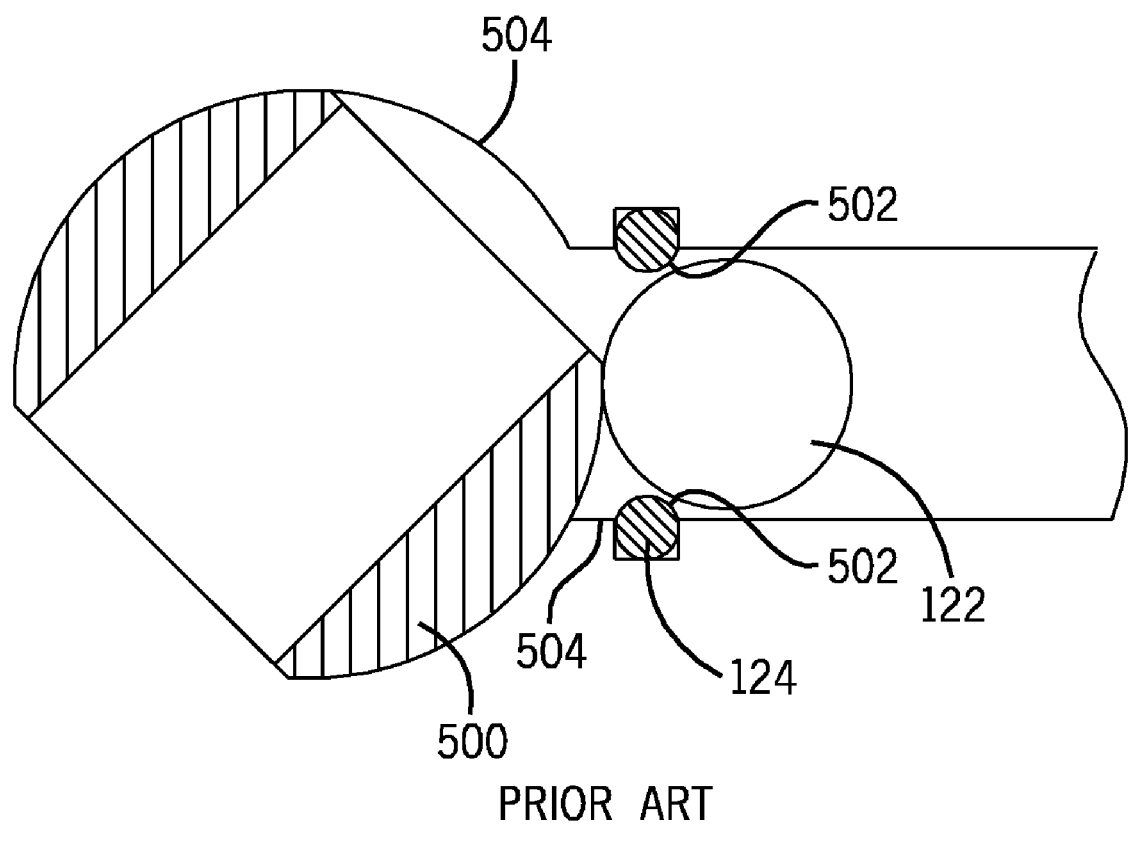
FIG. 23 is a cross-sectional view of a prior art rotating ball valve.
Figure 24:
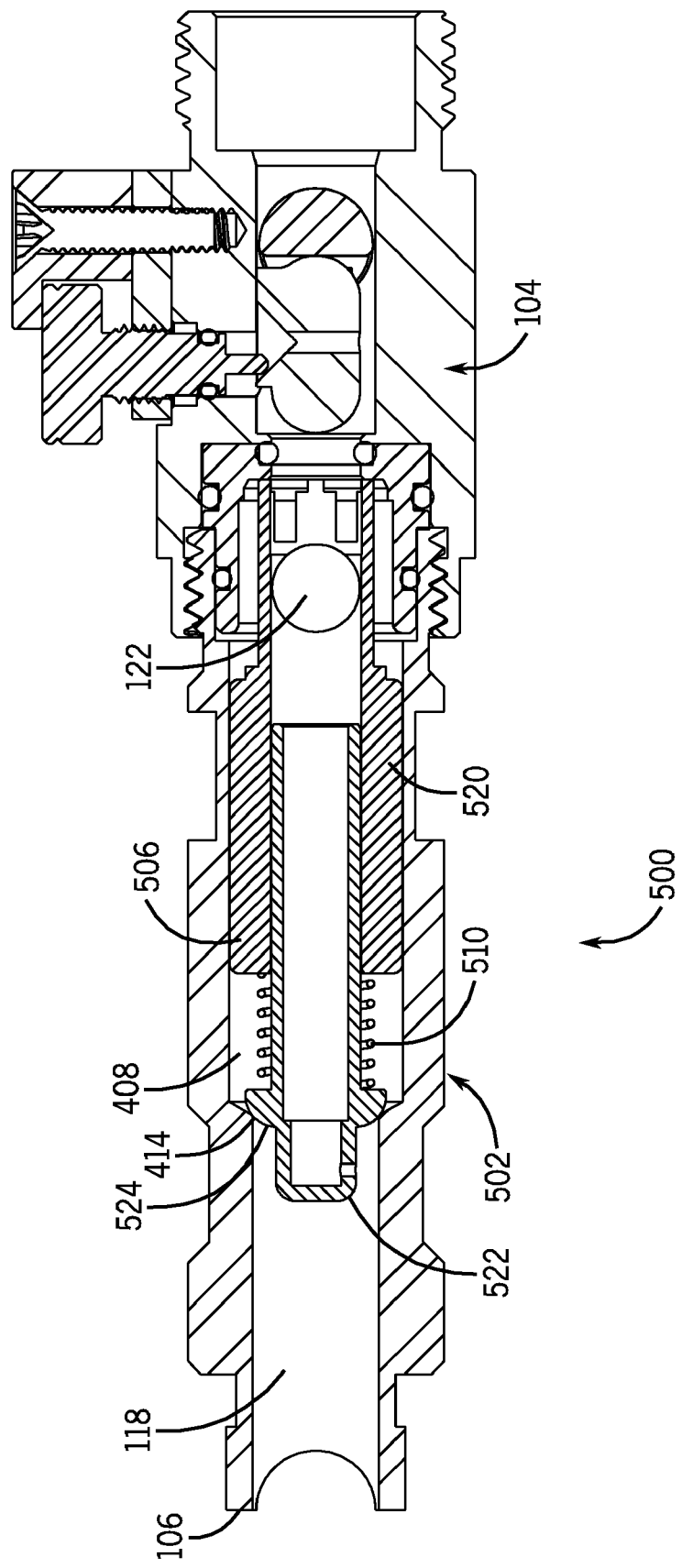
FIG. 24 is a side cross-sectional view of a check valve and shut-off valve reset assembly according to the present disclosure with a shut-off valve attached including an alternative embodiment of a shut-off slide.

As shown in FIG. 23, a prior art valve 500 such as might have been used to engage ball 122 and move the ball out of engagement with seal 124. Such a valve 500 would provide a shut-off reset function but in a bi-directional flow position, such as shown in FIG. 23, the passages 502 between ball 122 and seal 124 are quite small and may undesirably impede flow of cleaning solution around ball 122. If there are extensive lines that need to be cleaned or flushed during such an operation, an desirable amount of time or pressure may be required to complete the cleaning or flushing. Also note that valve 500 requires a separate seal 504 and cannot make use of seal 124 to halt flow when valve 500 is placed in a closed position.

Referring now to FIGS. 3 and 5, assembly 100 may include a drain 140 within which may be positioned a ball seal 144 urged into a sealed position by a spring 142. In a sealed position (shown in FIG. 3), ball 144 is seated against and seals an opening 146 which is in fluid communication with an annular groove 148 about stem 128. Annular groove 148 is in turn in fluid communication with a central axial opening 150. In the sealed position, liquid, or a mixture of liquid and gas is not permitted to pass out of chamber 118 through drain 140 and exit from assembly 100. In an open position (shown in FIG. 5), a portion of stem 128 displaces ball seal 144 from opening 146 and permits liquid or a mixture of liquid and gas to flow from chamber 118 out of assembly 100. Such a drain 140 may be useful to drain any liquid and gas combination within chamber 118 that may have caused ball 122 move forward and engage seal 124 within shut-off assembly 102. If this undesired gas is not drained from within chamber 118, then ball 122 will immediately move back against seal 124 even after ball 122 has been displaced from seal 124 and reset.

In use, drain 140 may be placed in the open position when handle 110 is moved to urge member 126 against seal 124. For example, in a beer distribution arrangement, a beer keg with which assembly 100 is in connected to may have run empty and some beer foam may have entered chamber 118. This beer foam will cause ball 122 to move toward and engage seal 124, stopping flow of the foam into chamber 120. Assembly 100 may then be disconnected from the empty beer keg and connected to a full keg. Any beer and beer foam mixture within chamber 118 needs to be vented so that shut-off assembly 102 will permit flow from chamber 118. Any residual foam within chamber 118 will immediately cause ball 122 to engage seal 124 and prevent flow. Thus, as handle 110 is moved to a position to move member 126 into engagement with seal 124 and displace ball 122 from seal 124, drain 140 may be opened to permit any foam within chamber 118 to escape. Observation of any liquid or liquid and gas (foam) flowing from opening 150 of stem 128 will indicate when the undesirable material has been cleared from chamber 118. Once this is observed, handle 110 may be moved back to the open position and flow from first end 106 to second end 108 may be reestablished.

Note that when thumbscrew 112 of assembly 100 is in a cleaning position, handle 110 may remain in the open position. This permits flow of a cleaning liquid through assembly 100 without permitting such liquid to exit through drain 140. If it is desired to flush drain 140, handle 110 may then be moved so that a portion of stem 128 displaces ball 144 from opening 146. Stem 128 may be configured so that the movement necessary to displace ball 144 may be accomplished with thumbscrew 112 in the cleaning position (i.e., so that stem 128 is not rotated enough to engage member 126, which is held in position by stem 133 of thumbscrew 112). Thus, at some intermediate position between open and closed for handle 110, a drain position would be defined. Alternatively, stem 128 may be configured so that drain 140 is moved to the open position when handle 110 is in the closed position.

Figure 9:
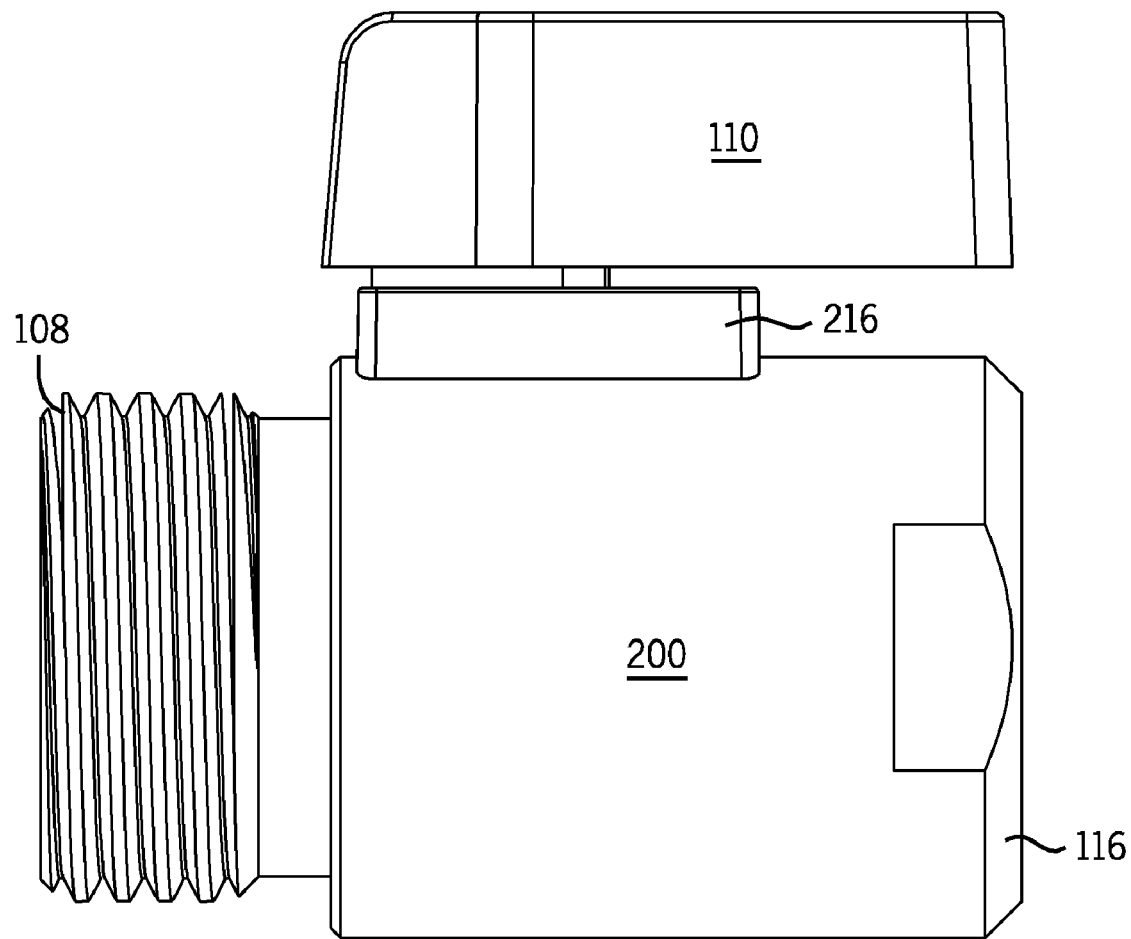
FIG. 9 is a side view of an alternative embodiment of a shut-off valve according to the present disclosure.
Figure 10:
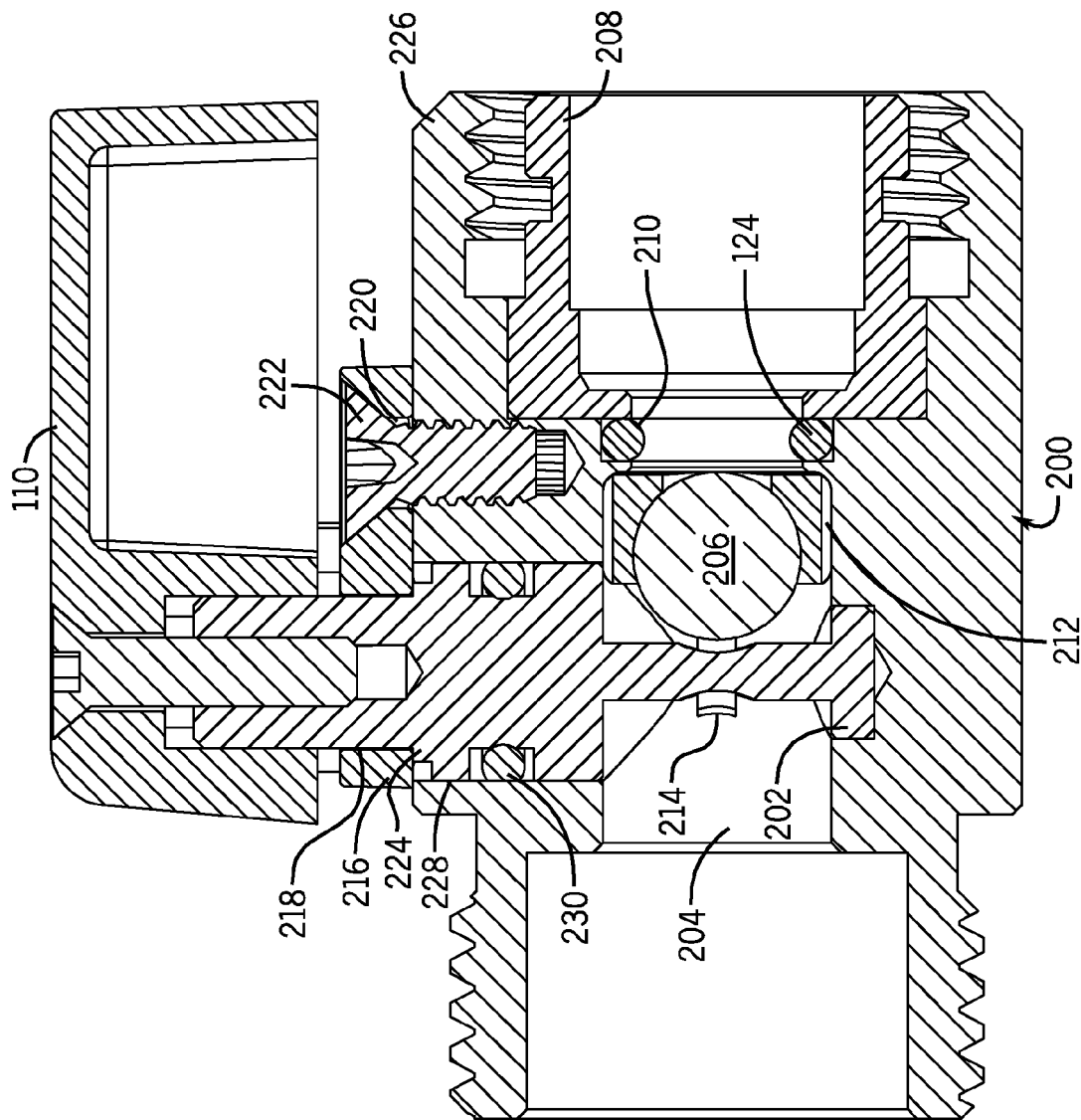
FIG. 10 is a side cross-sectional view of the shut-off valve of FIG. 9, with the valve is an open position.
Figure 11:
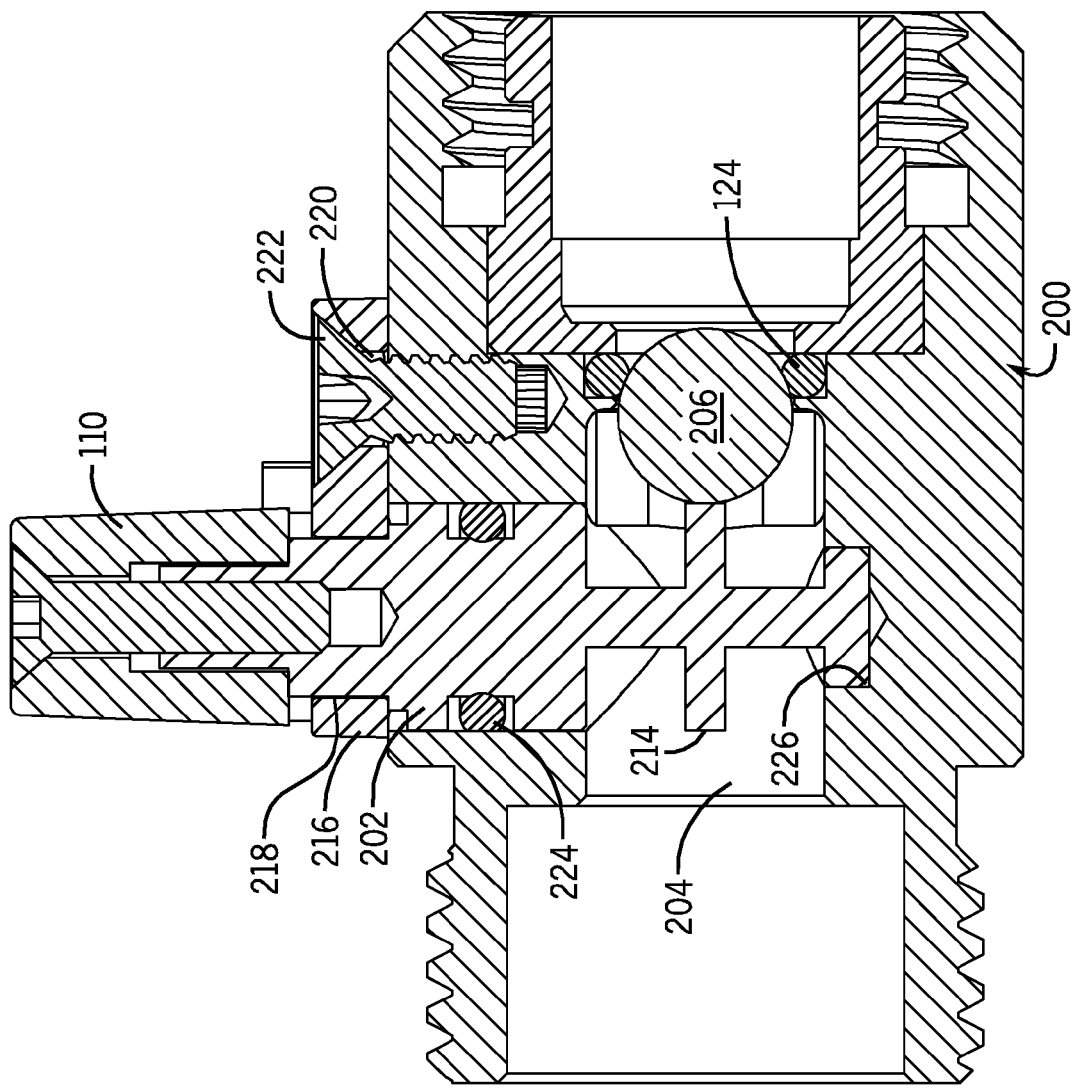
FIG. 11 is a side cross-sectional view of the shut-off valve of FIG. 9, with the valve is a closed position.

Referring now to FIGS. 9 to 11, an alternative embodiment anti-backflow/valve reset assembly 200 includes first end 116, second end 108 and handle 110. Handle 110 is mounted to a stem 202 which rotates within assembly 200 as handle 110 is moved between open and closed positions. Within an axial chamber 204, a ball 206 is captive between stem 202 and seal 124. A seal retaining insert 208 is positioned within assembly 200 to retain seal 124 within a groove 210. A positioning ring 212 is positioned within chamber 204 and about ball 206 to ensure that ball 206 stays centrally located within chamber 204 while permitting liquid to flow from first end 116 to second end 108. Note that assembly 200 does not include a drain and stem 202 does not include a drain actuating portion, as shown in FIGS. 1 to 8, above, and is not configured to hold ball 206 in a cleaning position. In this configuration, assembly 200 may be used either in concert with a shut-off valve assembly, as shown above, where it is not necessary to have bi-directional flow for cleaning or flushing. Alternatively, assembly 200 may be used where a check valve or anti-backflow device is required in a liquid delivery system.

FIGS. 9 and 10 show assembly 200 with handle 110 is the open position, where ball 206 is free to move within positioning ring 212 between stem 202 and seal 124. Liquid is permitted to flow through chamber 204 from first end 116 to second end 108. Movement of liquid in an opposite direction will urge ball 206 away from stem 202 and into engagement with seal 124, preventing backflow through assembly 200. FIG. 11 shows assembly 200 with handle 110 in a closed position, where a portion such as eccentric 214 of stem 202 is pressing ball 206 against seal 124 and preventing all liquid from flowing through chamber 204.

The advantage of assembly 200 with regard to a more traditional rotating valve assembly 500 of FIG. 23, is that a common seal 124 such as an O-ring provides a sealing surface against which ball or sealing member 206 is pressed to block flow. The member is generally stationary when engaging the seal. A rotary valve, such as assembly 500 requires a seal that is more complex in shape and against which the sealing member must rotate when the valve is moved between open, closed and intermediate positions. Maintenance of assembly 200 is also quire simple. A plate 216 defines an opening 218 through which a shank of stem 202 extends. Plate engages a shoulder 224 of stem 202 and holds the stem in position within assembly 200. Plate 216 also defines a second opening 220 through which a removable fastener 222, such as a screw, extends and engages a body 226 of assembly 200.

Inspection or replacement of the internal parts within assembly 200 may be accomplished by removing insert 208, allowing seal 124 to be removed, inspected and replaced, and by moving handle 110 from the open position to permit fastener 222 to be removed. Plate 216 is then free to be removed a stem receiving opening 228 of body 226. One or more O-rings 230 may be positioned about stem 202 to prevent flow from within chamber 204 through stem opening 228. These O-rings 230 may be inspected and replaced with stem 202 removed from body 226. Which stem 202 removed, ball or sealing member 206 and positioning ring 212 can be removed, inspected and replaced. With insert 208 repositioned to hold in seal 124, ball 206 and positioning ring 212 can be replaced within chamber 204, stem 202 reinserted into opening 228, capturing ball 206 between stem 202 and seal 124. With the reinsertion of screw 222 through plate 216, stem 202 is secured to body 226 and assembly 200 is ready for installation in a liquid delivery line.

Assembly 104, above, is similarly configured to disassembly and maintenance. Stem 128 extends entirely through a body 152 within an opening 154 (see FIG. 2). However, opening 154 and stem 128 are configured to permit removal of stem 128 by removing fastener 222 from plate 216. With stem 128 removed, member 126 may be removed, inspected and replaced. With the removal of a seal retaining insert 156, seal 124 can be removed, inspected and replaced.

Figure 12:
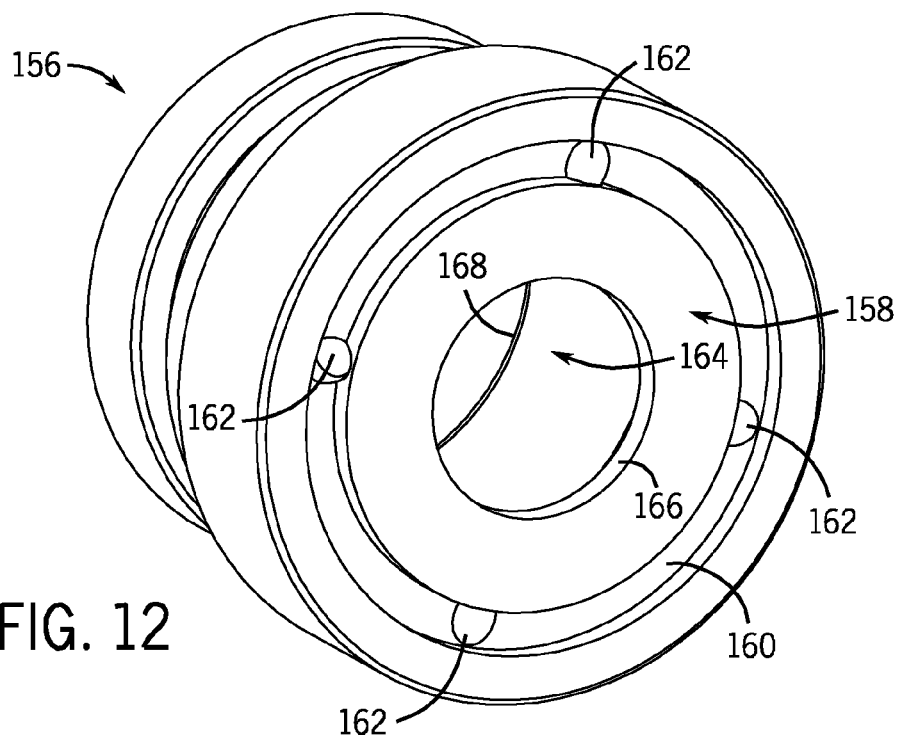
FIG. 12 is a perspective view of a seal retaining insert of the assembly of FIG. 2.
Figure 13:
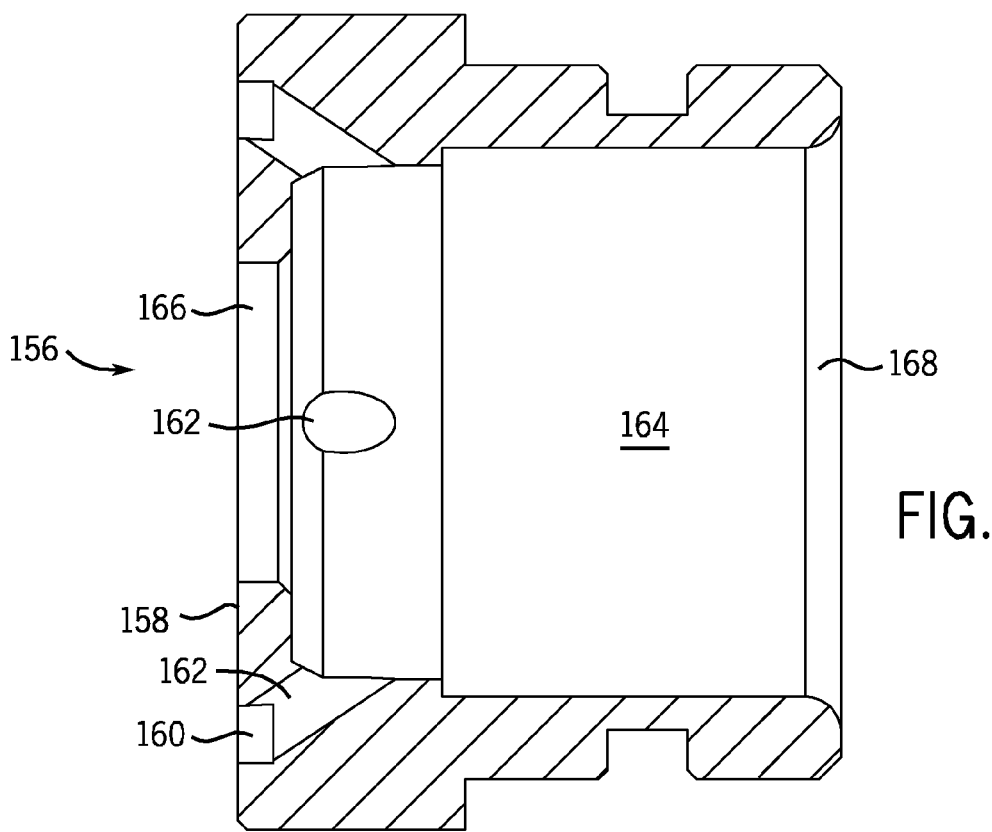
FIG. 13 is a side cross-sectional view of the insert of FIG. 12.

Referring now to FIGS. 12 and 13, seal retaining insert 156 may include an annular groove 160 in a seal retaining face 158. One or a plurality of channels 162 may be formed from an interior space 164 which is in fluid communication through an first end 168 with chamber 118 when installed within assembly 100, as shown above. A second end 166 of insert 156 is positioned adjacent seal 124 and permits ball 122 to extend through and engage seal 124 when shut-off valve assembly 102 is actuated. Groove 160 is in fluid communication with drain 140 and permits liquid or liquid and gas to be vented or drained as needed before assembly 100 is returned to the open position. Insert 156 is sized and configured to fit within first end 116 of body 152 and then be held in place against seal 124 by second end 114 of valve assembly 102. As shown above, valve assembly 102 is threadably received within reset assembly 104 but other releasably mounting arrangement are also contemplated within the scope of the present disclosure. Such arrangements might include but not be limited to quarter- or half-twist connections, rotating collar connections, and other releasable means of connecting the two assemblies in a liquid-tight fashion.

Figure 14:
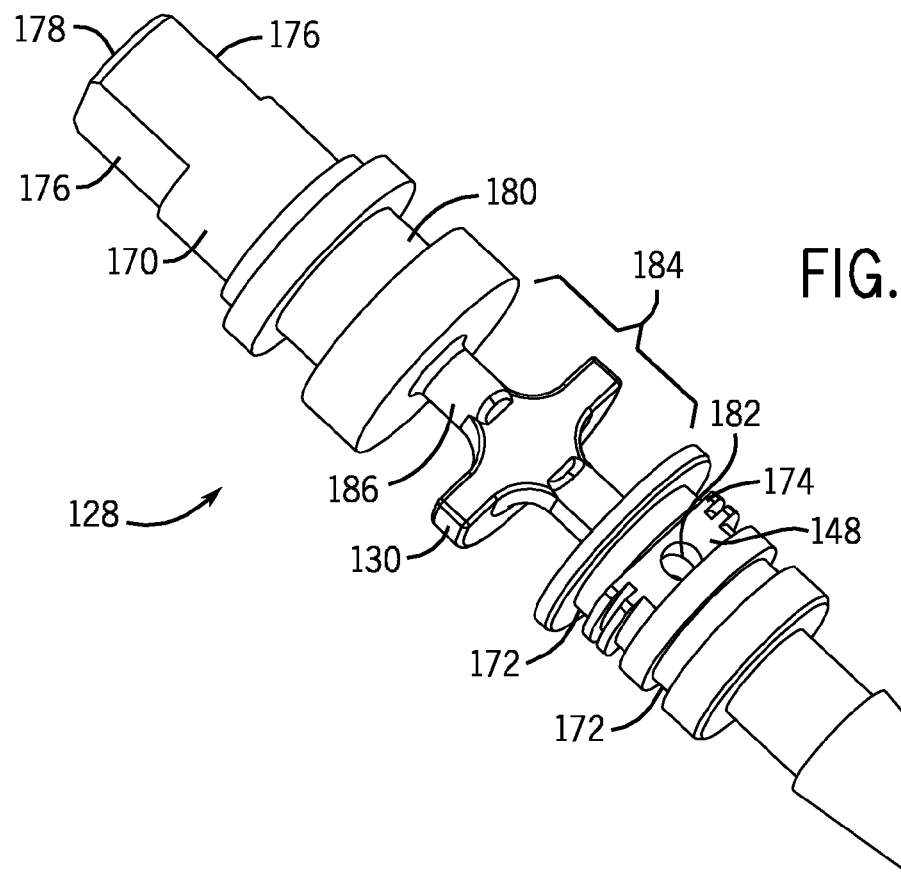
FIG. 14 is a perspective view of a rotating stem of the shut-off valve of FIG. 2.
Figure 15:
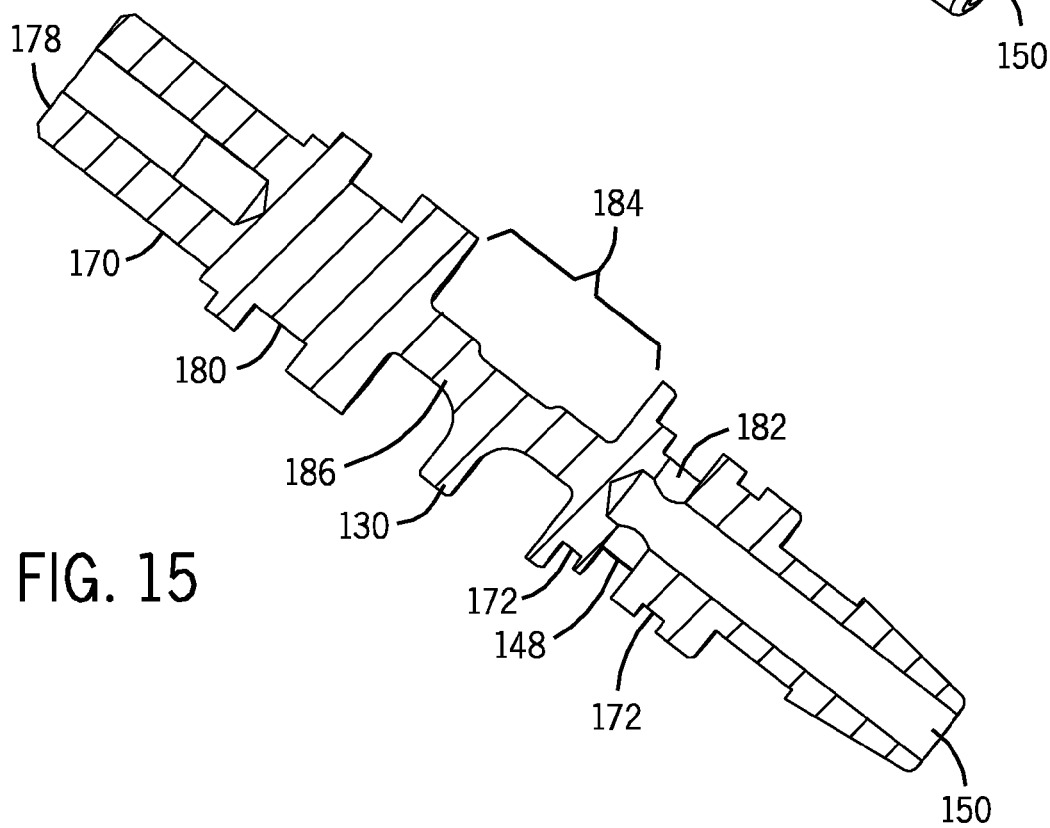
FIG. 15 is a side cross-sectional view of the stem of FIG. 14.
Figure 16:
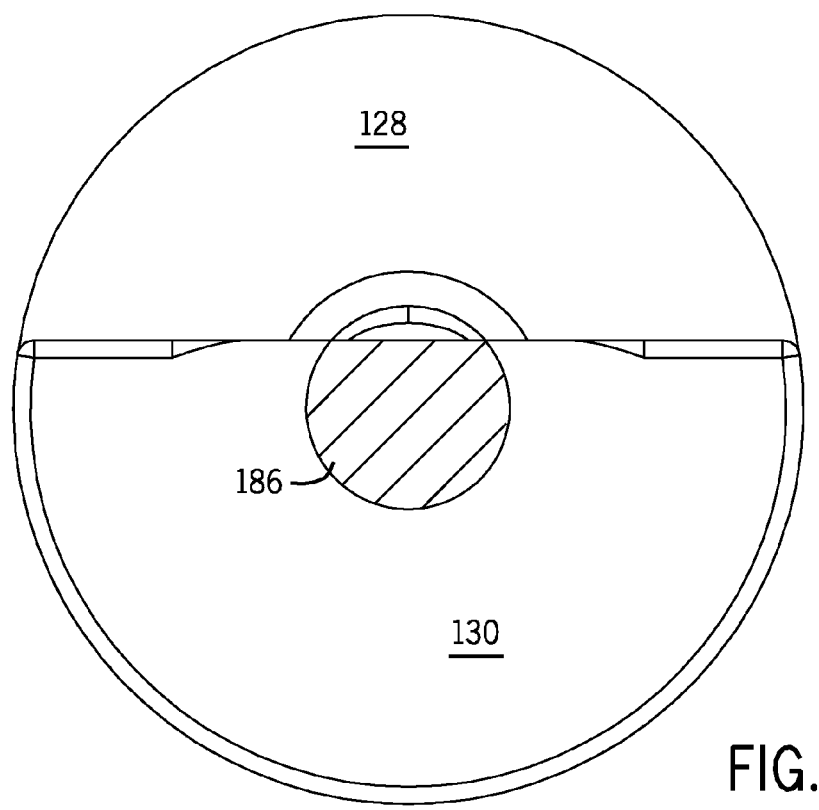
FIG. 16 is a transverse cross-sectional view of the stem of FIG. 14.
Figure 17:
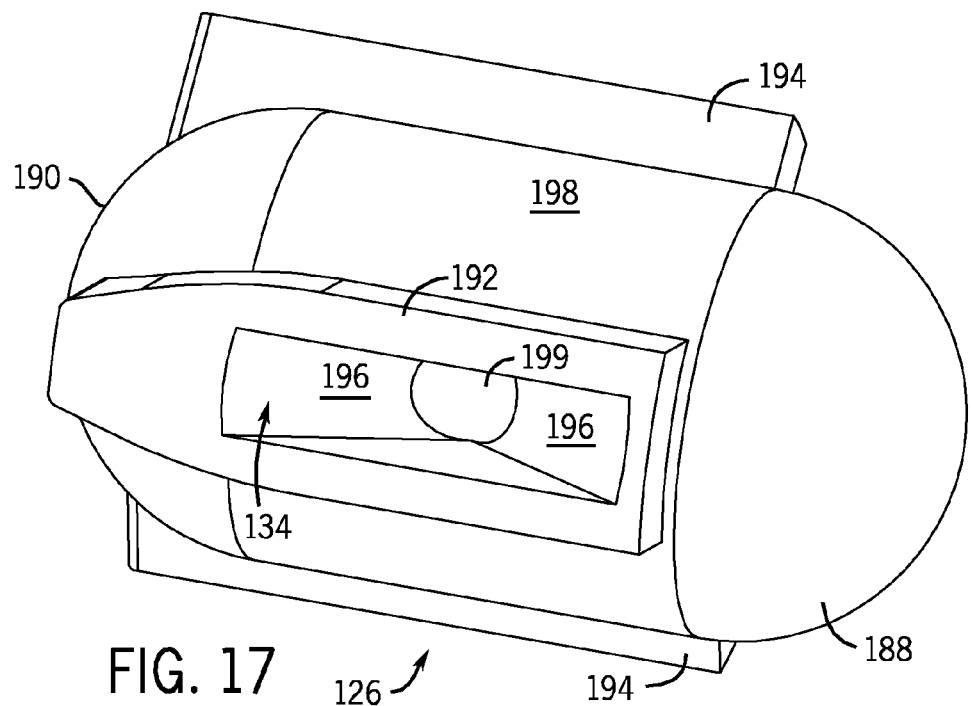
FIG. 17 is a perspective view of a shut-off valve slide of the assembly of FIG. 2.
Figure 18:
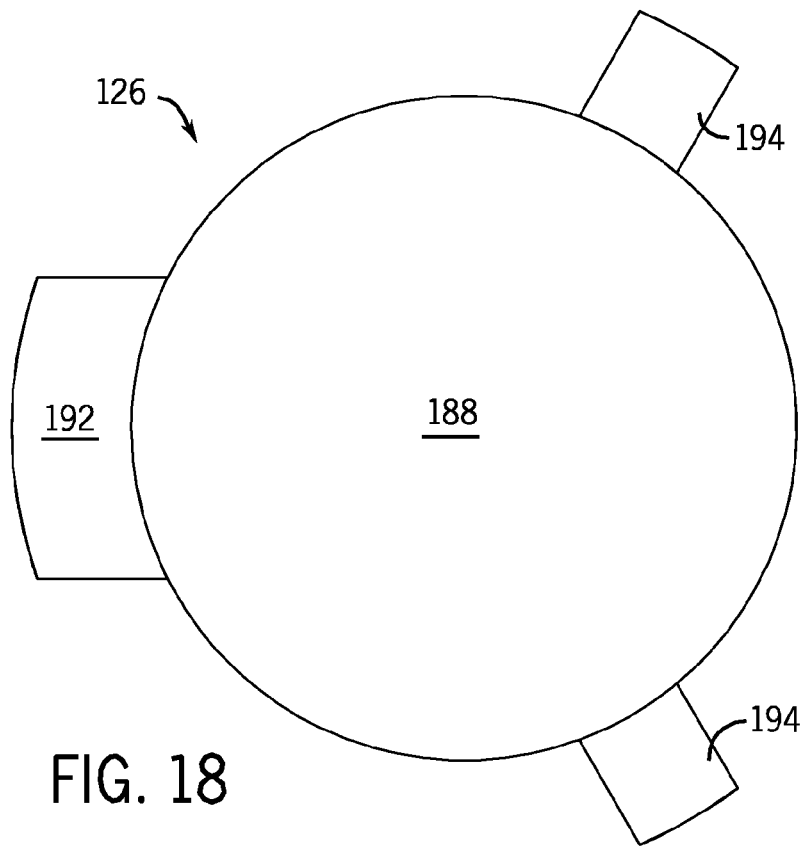
FIG. 18 is an end view of the slide of FIG. 17.
Figure 19:
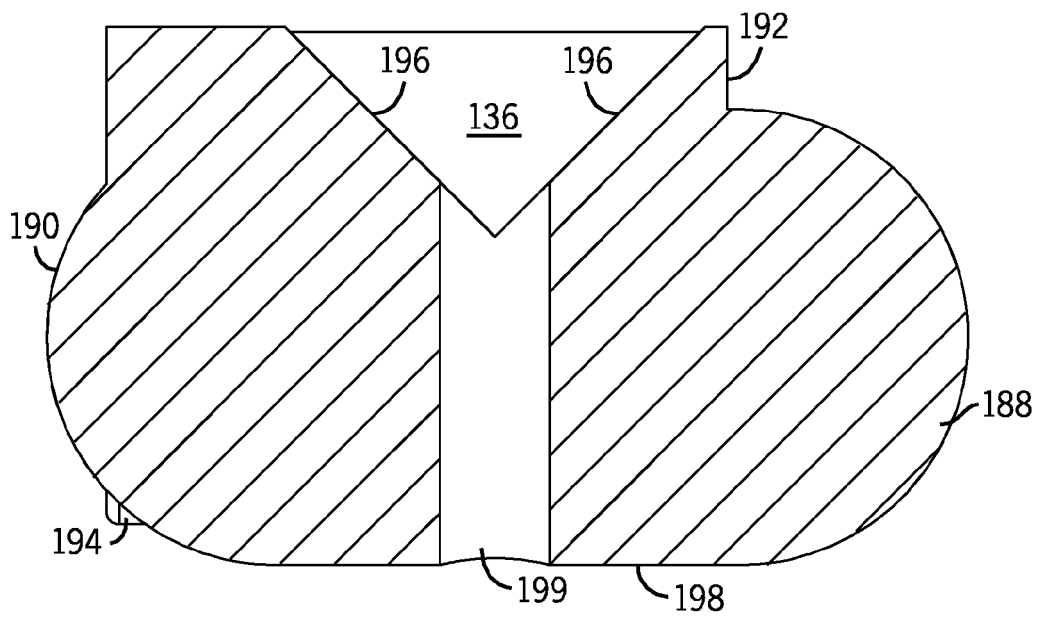
FIG. 19 is a side cross-sectional view of the slide of FIG. 17.
Figure 20:
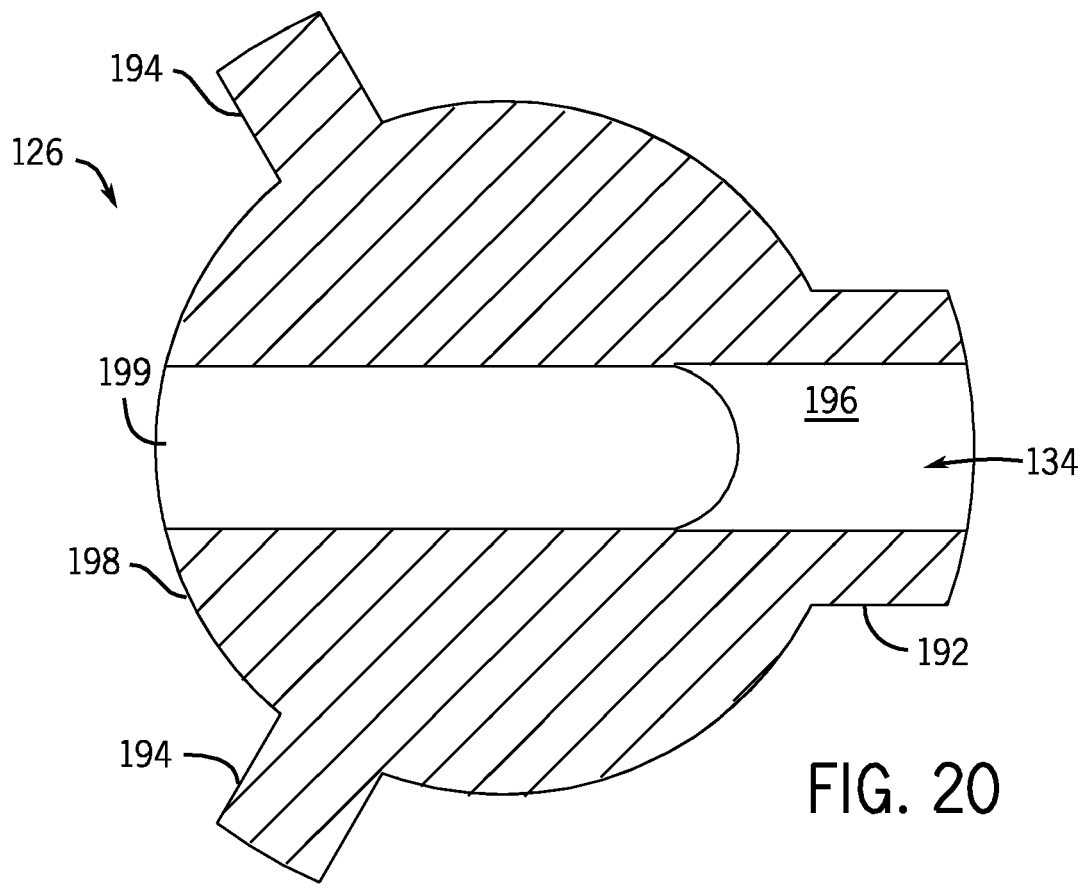
FIG. 20 is a transverse cross-sectional view of the slide of FIG. 17.

Referring now to FIGS. 14 to 16, stem 128 includes sealing member actuating portion 130 and a shank portion 170 which is configured to receive plate 216. A pair of flats 176 may be formed in a handle receiving end 178 to engage handle 110 and permit rotation of stem 128 via handle 110. An upper seal groove 180 is provided for a sealing member such as O-ring to seal against an interior wall of stem opening 154. A pair of lower seal grooves are provided to receive sealing members such as O-rings both above and below annular groove 148 which provides fluid communication between drain 140 and central axial opening 150 via a channel 182. Seals in grooves 172 keep liquid being drained from chamber 118 flowing through opening 150 and not about a lower portion of stem 128. Within annular groove 148 are one or more drain valve actuation elements which are configured to selectively engage ball 144 when handle 110 and stem 128 are positioned to permit drainage from chamber 118 through drain 140 and out of opening 150.

Central portion 184 of stem 128 is configured to be positioned within chamber 120 and permit flow of liquid from chamber 118 out second end 108. A narrowed shaft portion 186 extends within central portion 184 and provides a mounting point for member actuating portion 130. Preferably, central portion 184 is sized as needed to provide adequate strength for moving member 126 into engagement with seal 124 but is also kept as small as possible so as to minimize resistance to liquid flow through chamber 120.

Referring now to FIGS. 17 to 20, sealing member 126 includes a first generally spherical end 188 and an opposite end 190. First end 188 is sized and shaped generally spherically (or semi-spherically) to engage and form a liquid-tight seal with seal 124. Preferably, first end 188 is generally matched, size-wise, to the size of ball 122 to ensure that both will work effectively with seal 124. Second end 190 is shaped and configured to be engaged by portion 130 of stem so that member 126 may be urged into engagement with seal 124. While shown as generally semi-spherical in shape, it is not intended to limit the second end of member 126 to any particular shape, as long as that shape is compatible with the shape of portion 130 of stem 128. Recess 134 is formed in a first radial extension 192 extending outward from a central body 198 of member 126. Recess 134 includes at least one sloped inner wall 196 to aid in guiding stem 133 into recess 134 as thumbscrew 112 is advanced into body 152. As stem 133 is advanced deeper into recess 134, sloped wall 196 will help move member 126 into the desired position for cleaning or bidirectional flow through assembly 100. While walls 196 are shown as defining a constant slope, other shapes or configurations are contemplated which would aid in the positioning of member 126 as stem 133 advances deeper into recess 134.

At least a pair of solid radial extensions 194 may be provided about body 198 spaced apart from first extension 192. These extensions cooperate to position member 126 centrally within chamber 120 and permit liquid flow about member 126. While a total of three radial extensions are shown, this number is intended only as a minimum number and the total number of extensions may be higher. Also, recessed extension 192 and solid extensions 194 are shown, but member 126 may be configured with more recessed extensions and the more or fewer solid extensions within the scope of the present disclosure. A central opening 199 is shown at a bottom of recess 134 which may provide a stop to positively engage stem 133 and secure member 126 in the cleaning or bi-directional flow position. Opening 199 may or not extend laterally through member 126 as shown.

Figure 21:
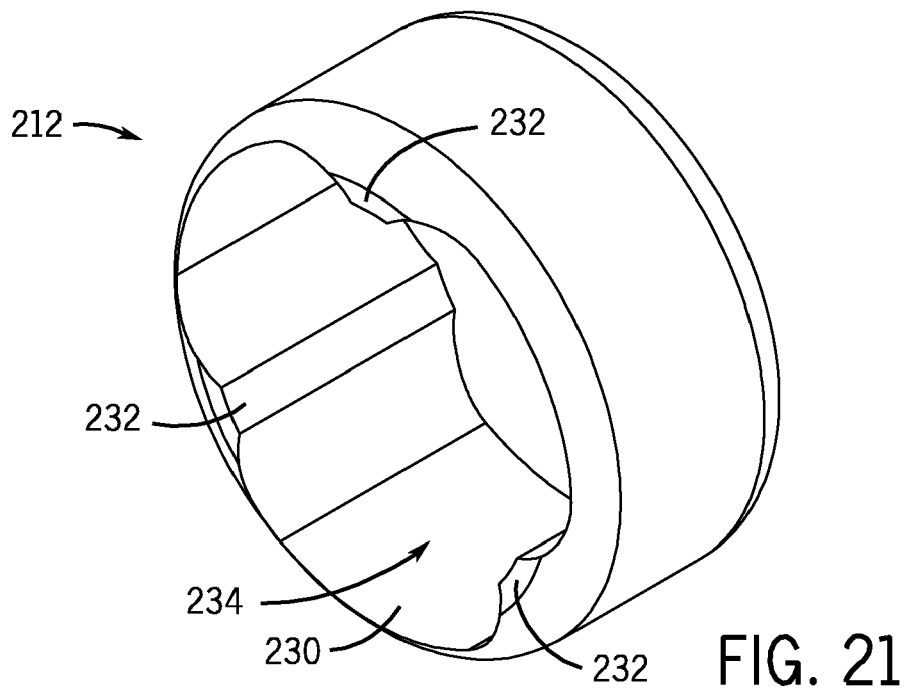
FIG. 21 is a perspective view of a ball seal positioning ring of the shut-off valve of FIG. 10.
Figure 22:
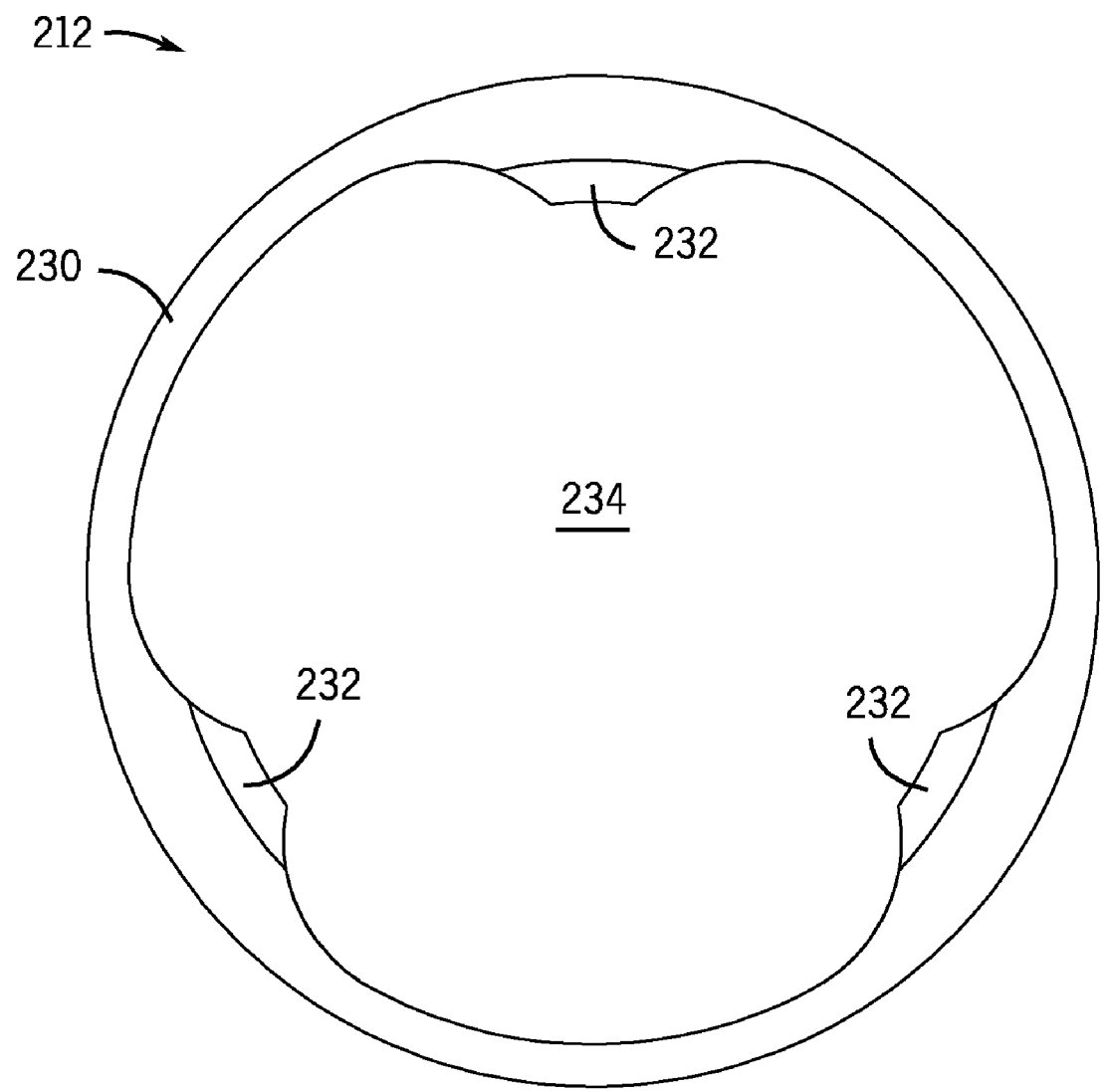
FIG. 22 is an end view of the positioning ring of FIG. 21.

Referring now to FIGS. 21 and 22, positioning ring 212 includes an outer ring portion 230 and at least three sealing member positioning portions 232 extending inward from ring portion 230. Positioning ring 212 serves to generally center ball 206 of assembly 200 within chamber 204. Similar to the extensions of member 126, described above, positioning ring 212 keeps ball 206 positioned to engage seal 124 when stem 202 is rotated to urge ball 206 to a closed position. Ball 206 is received within a central opening 234 and is permitting to move longitudinally between stem 202 and seal 124 when handle 110 is in the open position. Positioning portions 232 are preferably sized so that ball 206 is able to move freely within ring 212 while maintaining the ball generally centrally within chamber 204. Ring portion 230 is preferably sized to fit closely to an interior wall of chamber 204 and to be configured a thin as possible to minimize any impedance to flow through assembly 200.

Referring now to FIGS. 24 to 27, a further alternative assembly 500 includes a valve reset assembly 104 and a shut-off valve assembly 502 with a slide 506 within central axial passage 118. Shut off valve assembly 502 is configured similarly to valve assembly 102, with the exception of the arrangement of the slides within the respective assemblies. Referring now also to FIG. 3, valve assembly 102 includes a slide 406 positioned within a slide receiving area 408 of passage 118 defined by valve body 103. Slide 406 is urged away from seal 124 and toward a shoulder 414 at an opposite end of area 408 by a spring 410. A corresponding shoulder 412 of slide 406 engages shoulder 414 and provides a seal against fluid movement within passage 118. When there is pressure sufficient exerted through end 106 into passage 118 by fluid trying to flow from end 106 to end 108, the fluid will overcome spring 410, displacing shoulder 412 from shoulder 414 and permit the fluid to flow toward end 108.

As shown in FIG. 3, slide 406 is much smaller in diameter than area 408 and can move about side to side within the area. Further, spring 410 is required to push the entire slide to bring the shoulders into engagement and seal against fluid flow. If the slide is laterally displaced from the center of the area, the shoulders may not engage each other properly to seal against fluid flow.

FIGS. 24 to 27 show an alternative slide 506 within area 408. Slide 508 includes a fixed portion 520 and a movable portion 522 with a spring 510 positioned to press against fixed portion 520 and urge movable portion 522 toward shoulder 414. Movable portion 522 includes a mating shoulder 524 which engages shoulder 414 and creates a seal within passage 118 when fluid pressure from end 106 fails to overcome spring 5 10. Movable portion 522 is received within a central opening 526 of fixed portion 520, and ball seal 122 is also received within central opening 526. Preferably, movable portion is sized generally close to ball 122 and central opening 526 is sized to receive both to allow easy axial movement without excessive lateral movement.

Figure 25:
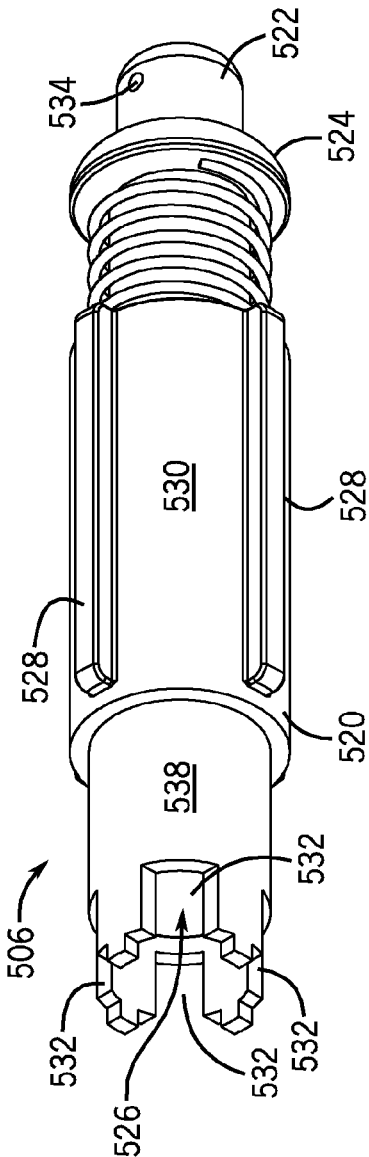
FIG. 25 is a perspective view of the shut-off slide of FIG. 24.
Figure 26:
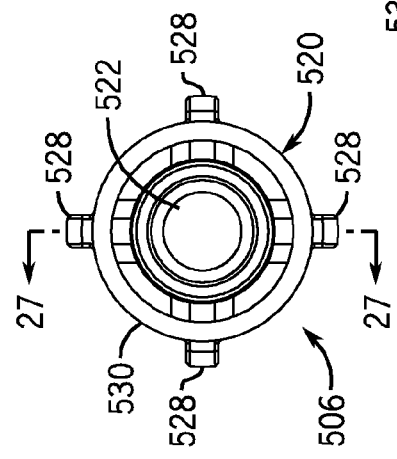
FIG. 26 is an end view of the shut-off slide of FIG. 24.
Figure 27:
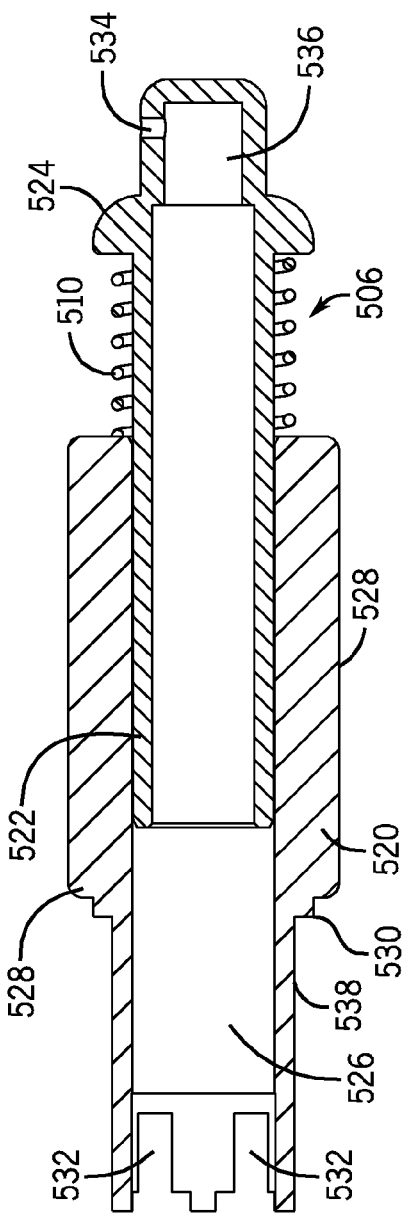
FIG. 27 is a side cross-sectional view of the shut-off slide of FIG. 24, taken along line 26-26 in FIG. 26.

Referring now to FIGS. 25 to 27, fixed portion 520 of slide 506 includes a plurality of radial extensions 528 on an outer surface 530. Extensions 528 are sized to extend to and generally engage an inner surface of area 408. Between this inner surface of area 408 and outer surface 530 of fixed portion 520 is an open area through which fluid may flow through passage 118 from end 106 toward end 108. After passing over outer surface 530, the fluid would pass over narrower portion 538 and pass through a plurality of openings 532 and over seal member 124 into the downstream portions of assembly 500.

Movable portion 522 also includes a inner passage 536 into which fluid may pass from passage 118 through an opening 534. When the fluid in generally uniform, with no air or gas bubbles in the flow, and ball 122 is displaced from seal 124, fluid may flow into inner passage 536 through opening 524 but not displace ball 122 toward seal 124. However, once gas bubbles within the fluid flow reach opening 534 from end 106, the gas enters inner passage 536 and acts upon ball 122 to force ball 122 against seal 124 and shut off flow. If the fluid source, such as a beer keg, attached to end 106 is removed or disconnected to be replaced with a fresh source, fluid pressure through end 106 drops below the force exerted by spring 520 and shoulder 524 of moveable portion 522 is brought into engagement with shoulder 414. Shut-off valve 502 is then blocking flow in both directions through passage 118.

As described above, when a fresh fluid source is reattached to end 106, the fluid pressure may then overcome spring 510 and move shoulder 414 and 524 apart. Reset 104 may be actuated to push ball 122 from seal 124 and permit flow from end 106 to 108 to resume.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:
1. A liquid check valve comprising:
   a valve body defining a liquid flow path through a central open chamber having a first end and a second end;
   the valve body including a seal within the central chamber between the first end and the second end, and a rotating stem extending into the central chamber through at least one side of the valve body, the rotating stem extending outside the valve body, the stem positioned toward the second end with respect to the seal;
   a sealing member positioned within the valve body between the first end and the seal, the sealing member sized to cooperate with the seal to prevent movement of liquid through the valve body when the sealing member engages the seal;
   a reset member positioned within the valve body between the rotating stem and the seal, the reset member sized to fit within the central chamber while permitting liquid to move through the central chamber about the reset member and permitting the reset member to move laterally within the central chamber between the stem and the seal;
   the reset member sized to cooperate with the seal to prevent movement of liquid through the check valve when the reset member engages the seal;
   the rotating stem including an eccentric portion that selectively engages the reset member as the stem is rotated, the stem being moveable between a first rotational position where the eccentric portion engages the reset member and presses the reset member against the seal, and a second rotational position where the eccentric portion is disengaged from the reset member and the reset member is free to move within the central chamber between the stem and the seal;
   wherein the reset member is sized to extend through the seal and engage the sealing member to urge the sealing member toward the first end away from the seal.

2. The liquid check valve of claim 1, further comprising a ball as the sealing member.

3. The liquid check valve of claim 1, further comprising the reset member including opposing continuous radius ends, one configured to selectively engage the seal and the other configured to selectively engage the rotating stem.

4. The liquid check valve of claim 3, the reset member further comprising a recess positioned between the ends, and the valve body including a second stem which may be selectively advanced to engage the recess of the reset member and hold the reset member in position within the valve body.

5. The liquid check valve of claim 4, wherein with the second stem engaging the recess of the reset member, liquid is free to move through the valve body between the seal and the reset member.

6. The liquid check valve of claim 4, wherein the second stem is threadably engaged with the valve body.

7. The liquid check valve of claim 5, wherein the reset member extends through the seal to engage the sealing member and prevent the sealing member from engaging the seal when the stem engages the recess of the reset member.

* * * * *